(12) United States Patent
Gami et al.

(10) Patent No.: US 9,731,773 B2
(45) Date of Patent: Aug. 15, 2017

(54) NODE FOR A SPACE FRAME

(71) Applicant: Caterpillar Inc., Peoria, IL (US)

(72) Inventors: Rahul N. Gami, Peoria, IL (US); Ajay Dnyandeo Yadav, Aurora, IL (US); Richard K. Huff, Germantown Hills, IL (US); Jarrod Delane Neal, Peoria, IL (US); Matthew M. Robinson, Peoria, IL (US); Tad W. Miller, Oreana, IL (US); Brandon C. Brenner, Decatur, IL (US); David William Holthaus, Monticello, IL (US); Jacob Warner Bell, Decatur, IL (US); Michael H. Noble, Peoria, IL (US); Edward Patrick Ormiston, Sullivan, IL (US); Hemant Prasad Mallampalli, Forsyth, IL (US); Thierry A. Marchione, Heber City, UT (US); Michael R. Spengler, Stonington, IL (US)

(73) Assignee: Caterpillar Inc., Peoria, IL (US)

( * ) Notice: Subject to any disclaimer, the term of this patent is extended or adjusted under 35 U.S.C. 154(b) by 126 days.

(21) Appl. No.: 14/645,092

(22) Filed: Mar. 11, 2015

(65) Prior Publication Data

US 2016/0264187 A1    Sep. 15, 2016

(51) Int. Cl.
| | | |
|---|---|---|
| *E04B 1/19* | (2006.01) |
| *B62D 27/02* | (2006.01) |
| *B62D 25/00* | (2006.01) |
| *B62D 65/02* | (2006.01) |

(52) U.S. Cl.
CPC ............ *B62D 27/02* (2013.01); *B62D 25/00* (2013.01); *B62D 65/02* (2013.01); *E04B 1/1903* (2013.01)

(58) Field of Classification Search
CPC .......... E04B 1/1903; E04B 2001/1915; E04B 1/1906; E04B 1/1909; E04B 1/1912; E04B 2001/1918; E04B 2001/1966
See application file for complete search history.

(56) References Cited

U.S. PATENT DOCUMENTS 3,596,950 A * 8/1971 Wipkink ................. B63B 9/065
                                                              403/172
3,921,360 A * 11/1975 Baldwin ............... E04B 1/1906
                                                              403/171

(Continued)

FOREIGN PATENT DOCUMENTS

DE        2047271 A1 * 6/1971   ........... E04B 1/1906
EP        0031804 A2    7/1981

(Continued)

*Primary Examiner* — Rodney Mintz
(74) *Attorney, Agent, or Firm* — Finnegan, Henderson, Farabow, Garrett & Dunner, LLP

(57) ABSTRACT

A node is disclosed. The node may have a core. The node may also have a projection extending from the core. Further the node may have a structural member attached to the projection. The node may also have a top cover having a top recess. The top recess may be configured to receive the structural member. Additionally, the node may have a bottom cover having a bottom recess. The bottom recess may be configured to receive the structural member. In addition the node may have a fastener to connect the top cover and the bottom cover.

8 Claims, 26 Drawing Sheets

(56) References Cited

U.S. PATENT DOCUMENTS

| | | | | |
|---|---|---|---|---|
| 4,332,501 A * | 6/1982 | Slysh | E04B 1/19 | |
| | | | 403/171 | |
| 4,480,418 A * | 11/1984 | Ventrella | E04B 1/1906 | |
| | | | 403/171 | |
| 4,489,659 A * | 12/1984 | Kamohara | B66C 23/70 | |
| | | | 104/107 | |
| 4,624,090 A * | 11/1986 | Stienen | E04B 1/1906 | |
| | | | 403/172 | |
| 4,677,805 A * | 7/1987 | Schleisner | E04B 1/1903 | |
| | | | 403/170 | |
| 4,790,172 A | 12/1988 | Simensen et al. | | |
| 4,922,669 A * | 5/1990 | De Pas | E04B 1/1903 | |
| | | | 403/171 | |
| 4,925,330 A * | 5/1990 | Cornish | E04B 1/1912 | |
| | | | 403/169 | |
| 4,982,546 A * | 1/1991 | Lange | E04B 1/1906 | |
| | | | 403/174 | |
| 5,013,176 A * | 5/1991 | Orbom | E04B 1/1903 | |
| | | | 403/171 | |
| 5,072,553 A * | 12/1991 | Bozetto | E04H 5/12 | |
| | | | 261/DIG. 11 | |
| 5,127,759 A * | 7/1992 | Orbom | E04B 1/1903 | |
| | | | 403/171 | |
| 5,144,830 A * | 9/1992 | Ferrotti | B21C 37/296 | |
| | | | 72/356 | |
| 5,230,197 A * | 7/1993 | Hart | E04B 1/19 | |
| | | | 52/638 | |
| 5,265,395 A * | 11/1993 | Lalvani | B44C 3/123 | |
| | | | 403/176 | |
| 5,584,156 A * | 12/1996 | Lange | F16B 5/004 | |
| | | | 24/20 R | |
| 5,588,274 A * | 12/1996 | Lange | F16B 5/004 | |
| | | | 24/20 R | |
| 5,626,434 A | 5/1997 | Cook | | |
| 5,884,686 A * | 3/1999 | Wood | E04B 1/1903 | |
| | | | 164/235 | |
| 6,032,430 A * | 3/2000 | Soukup | E04B 1/585 | |
| | | | 403/170 | |
| 6,131,281 A | 10/2000 | Morley | | |
| 6,148,581 A | 11/2000 | Separautzki | | |
| 6,378,265 B1 * | 4/2002 | Konstandt | E04B 1/1903 | |
| | | | 403/171 | |
| 6,475,117 B1 * | 11/2002 | Berglund | A63B 9/00 | |
| | | | 403/171 | |
| 8,590,216 B1 * | 11/2013 | Hurt, III | E04B 1/3211 | |
| | | | 403/171 | |
| 8,651,914 B2 * | 2/2014 | Sisamos | A63H 33/062 | |
| | | | 446/120 | |
| 8,820,025 B1 * | 9/2014 | Rochas | E04B 1/1906 | |
| | | | 52/638 | |
| 9,562,352 B2 * | 2/2017 | Benthien | B64C 3/38 | |
| 2004/0091307 A1 | 5/2004 | James | | |
| 2005/0170120 A1 * | 8/2005 | Teitelbaum | E04B 1/30 | |
| | | | 428/36.91 | |
| 2008/0175655 A1 * | 7/2008 | Daubner | A47B 47/0016 | |
| | | | 403/172 | |
| 2009/0313938 A1 * | 12/2009 | Li | E04B 1/19 | |
| | | | 52/656.9 | |
| 2012/0263521 A1 | 10/2012 | Auer et al. | | |
| 2012/0328837 A1 | 12/2012 | Goehlich et al. | | |
| 2013/0045042 A1 * | 2/2013 | Ohlson | E04B 1/585 | |
| | | | 403/171 | |
| 2014/0331591 A1 * | 11/2014 | Ohlson | E04B 1/585 | |
| | | | 52/653.2 | |
| 2014/0348572 A1 * | 11/2014 | Matsuzawa | E04B 1/19 | |
| | | | 403/57 | |
| 2015/0021285 A1 * | 1/2015 | Pacaci | F16B 7/00 | |
| | | | 211/182 | |
| 2015/0101645 A1 * | 4/2015 | Neville | E04B 1/3211 | |
| | | | 135/125 | |
| 2015/0107181 A1 * | 4/2015 | Larsen | E04B 1/1903 | |
| | | | 52/655.1 | |
| 2015/0152664 A1 * | 6/2015 | Larsen | B21C 37/296 | |
| | | | 52/651.07 | |
| 2015/0267397 A1 * | 9/2015 | Benthien | B64C 3/38 | |
| | | | 52/645 | |
| 2016/0230745 A1 * | 8/2016 | Patberg | E04H 12/085 | |
| 2016/0264189 A1 * | 9/2016 | Gami | B62D 27/023 | |

FOREIGN PATENT DOCUMENTS

| | | | |
|---|---|---|---|
| EP | 1116528 A2 | 7/2001 | |
| FR | 2990481 A1 * | 11/2013 | F16B 12/28 |
| WO | WO 2013/185770 A1 | 12/2013 | |

* cited by examiner

NODE FOR A SPACE FRAME

TECHNICAL FIELD

The present disclosure relates generally to a node and, more particularly, to a node for a space frame.

BACKGROUND

Off-highway load hauling machines, such as mine or quarry trucks, typically include a heavy metallic frame supported at the front and rear by two or more sets of wheels, a truck bed pivotable at the rear end, and an engine to move the truck. Such off-highway machines typically carry very heavy payloads, for example, several tens to hundreds of tons of material such as sand, gravel, mining materials, etc. Further, an off-highway truck typically travels over undeveloped and unpaved roads, which typically do not have a smooth or flat surface. As a result different amounts of ground load may be reacted through the wheels of the truck on different portions of the truck frame.

The frame for an off-highway truck typically consists of heavy gage metal beams and plates welded together and designed to support the weight of the payload and to withstand the torsional and other stresses induced by the uneven ground loads. These structural requirements make the frame heavy. Any prime mover used to move the truck must not only move the weight of the payload, but also the weight of the truck frame. To improve fuel efficiency of the prime mover and reduce the cost of operating such machines, it is desirable to decrease the weight of the machine while improving the machine's ability to carry higher payloads and also withstand the stresses generated during operation.

One potential solution replaces the machine frame with a space frame that includes triangulated structural members connected to each other at nodes or joints. Typically, such space frames have only been used for low-profile light trucks that can transport people. Employing a space frame to support the weight and the payload of off-highway load hauling machines requires joining structural members having relatively larger dimensions and thicknesses. Moreover, connecting such structural members may require specialized tooling and fixtures, which may add to the cost of manufacture and the time required to manufacture the space frame.

U.S. Pat. No. 5,626,434 to Cook issued on May 6, 1997 ("the '434 patent"). In particular, the '434 patent discloses a node to connect frame members. The '434 patent discloses prefabricated elongated frame members with headed ends, which fit into matching recessed sockets in the connector joint. The '434 patent further discloses that the connector comprises three parts which nestle one on top of another on a common axis and which are held together with a single bolt fastening means. The '434 patent also discloses that mating pair of interior surfaces have matching recesses which in pairs form sockets for receiving the frame member head ends. Further, the '434 patent discloses that a minimum of two chordal frame member ends and corresponding pairs of matching recesses are T-shaped and located between and on the interior surfaces of the first and second parts. The '434 patent also discloses that the head ends are bolted on to the frame members.

Although the '434 patent appears to disclose a connector capable of connecting frame members both in-plane and out-of-plane, the disclosed connector may still be inadequate for off-highway load hauling machines. For example, the disclosed frame members of the '434 patent include head ends bolted to frame members. The bolted head end joints of the '434 patent may not be able to carry the loads generated due to the weight and payload of an off-highway load hauling machine. Further, the disclosed bolted joints of the '804 patent may not adequately withstand torsional loads imposed on the space frame. Additionally, the bolted joints may become loose during operation of the off-highway load hauling machine, making it unsafe to operate the machine. Tightening the loose joints may be difficult, time consuming, and may require the machine to remain out of service for a long time. Manufacturing the connector parts with curvilinear sockets to receive the spherical shaped head ends may also require complicated fixtures and expensive machining processes.

The node of the present disclosure solves one or more of the problems set forth above and/or other problems in the art.

SUMMARY

In one aspect, the present disclosure is directed to a node. The node may include a core. The node may also include a projection extending from the core. Further the node may include a structural member attached to the projection. The node may also include a top cover having a top recess. The top recess may be configured to receive the structural member. Additionally, the node may include a bottom cover including a bottom recess. The bottom recess may be configured to receive the structural member. In addition the node may include a fastener to connect the top cover and the bottom cover.

In another aspect, the present disclosure is directed to a method of fabricating a node. The method may include fabricating a top cover having a top recess. The method may also include fabricating a bottom cover having a bottom recess. Further, the method may include fabricating a core having a projection. The method may also include fabricating a structural member having a node attach portion with a non-circular cross-section. The method may also include attaching the node attach portion of the structural member to the projection. In addition, the method may include assembling the core on the bottom so that an outer surface of the structural member is received in the bottom recess. The method may further include assembling the top cover so that the outer surface of the structural member is received in the top recess. Additionally, the method may include attaching the top cover to the core using a first fastener and attaching the bottom cover to the core using a second fastener.

DETAILED DESCRIPTION

Figure 1:
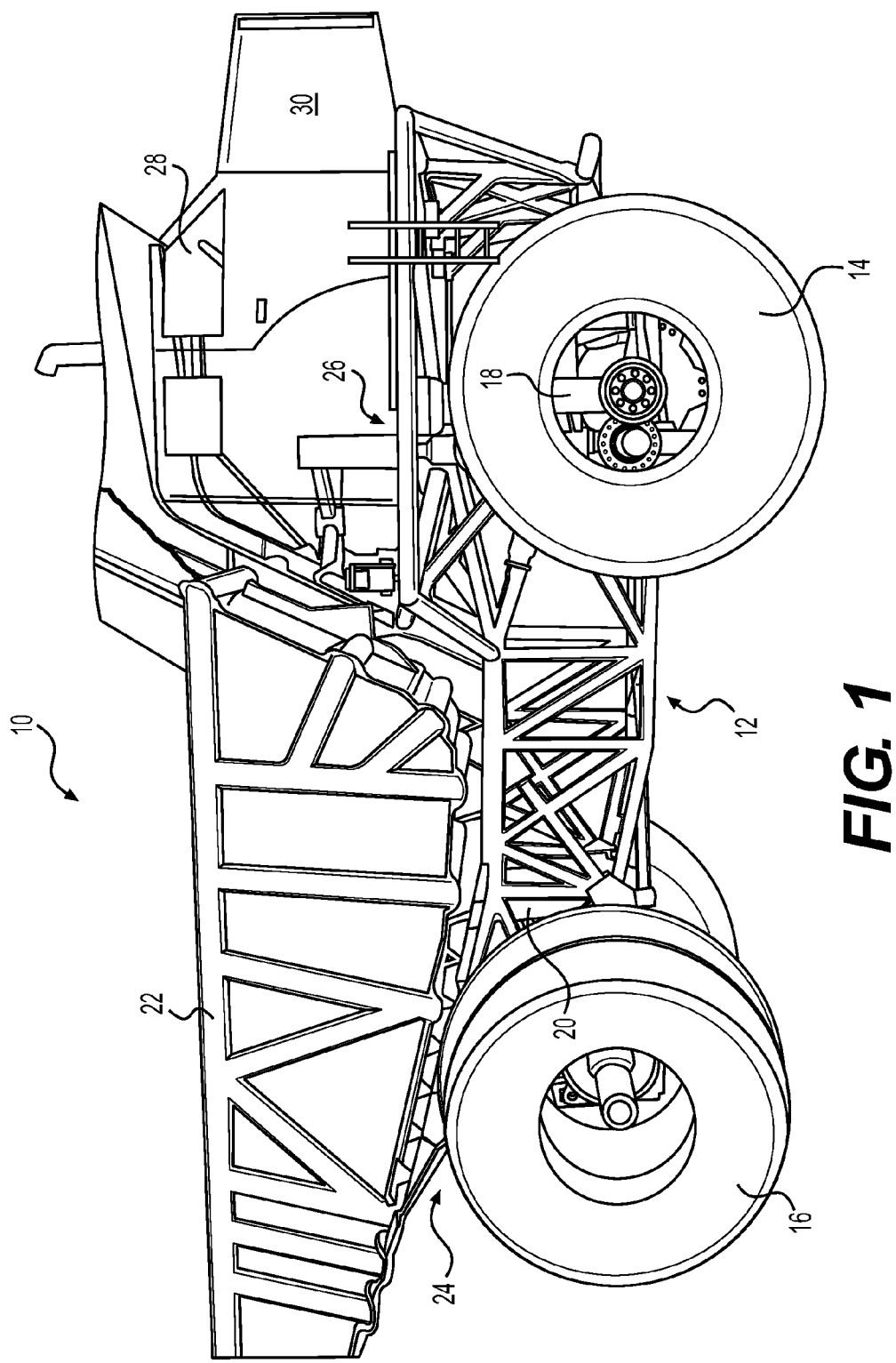
FIG. 1 is a pictorial illustration of an exemplary disclosed machine.

FIG. 1 illustrates an exemplary embodiment of a machine 10. Machine 10 may be a mobile machine that performs some type of operation associated with an industry such as mining, construction, or any other industry known in the art. For example, as shown in FIG. 1, machine 10 may be an earth moving machine such as an off-highway mine or quarry truck designed, for example, to haul several tens or hundreds of tons of sand, gravel, dirt, and/or other construction and mining materials, etc. Machine 10 may have a space frame 12 supported by front wheels 14 and rear wheels 16. Front and rear wheels 14, 16 may be connected to space frame 12 by front suspension members 18 and rear suspension members 20, respectively. Machine 10 may also include a bed 22 supported by space frame 12. Bed 22 may be attached pivotably to a rear end 24 of space frame 12. Bed 22 may also be attached movably to a front end 26 of space frame 12. Bed 22 may be configured to be raised at front end 26, while pivoting about rear end 24 to dump the contents of bed 22 on the ground.

Machine 10 may have an operator cabin 28 supported by space frame 12. Additionally, machine 10 may have a prime mover 30 supported by space frame 12. Prime mover 30 may be configured to propel front and rear wheels 14, 16 in the forward or rearward direction. In an exemplary embodiment, as shown in FIG. 1, prime mover 30 may be lengthwise aligned on space frame 12 along a travel direction of machine 10. One skilled in the art will recognize, however, that prime mover 30 may be aligned transversally, or may be located in any other orientation on space frame 12.

In one exemplary embodiment, prime mover 30 may be an internal combustion engine, which may be a two-stroke or four-stroke diesel engine. One skilled in the art will recognize, however, that prime mover 30 may be any other type of internal combustion engine such as, for example, a gasoline engine, or a gaseous fuel-powered engine. Prime mover 30 may be connected to front and/or rear wheels 14, 16 via other components such as a drive train (not shown) to transfer motive power to move front and rear wheels 14, 16 in a forward or rearward direction. Machine 10 may also be equipped with a steering mechanism (not shown) and controls (not shown) to move machine 10 and/or raise or lower bed 22. The steering mechanism and the controls may be located within operator cabin 28 of machine 10.

Figure 2:
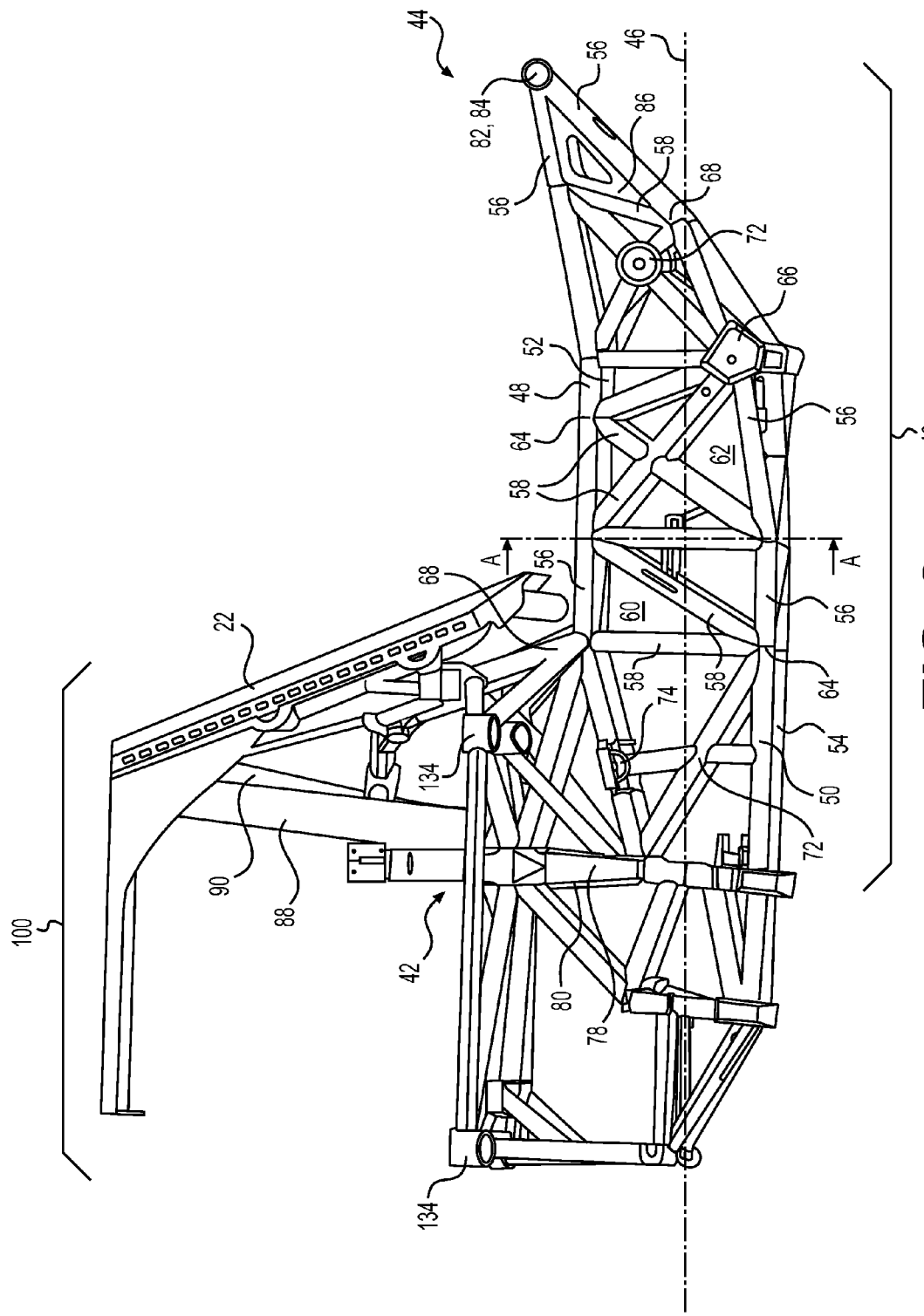
FIG. 2 is a pictorial illustration of a side-view of an exemplary disclosed space frame for the machine of FIG. 1.

FIG. 2 illustrates a view of an exemplary disclosed space frame 12 for machine 10 as seen from a side of machine 10. As shown in FIG. 2, space frame 12 may include a rear frame portion 40 and a front frame portion 100. Rear frame portion 40 may have a first end 42 and a second end 44. Rear frame portion 40 may extend lengthwise between first end 42 and second end 44 substantially along a longitudinal axis 46 of machine 10. Rear frame portion 40 may have first longitudinal structure 48, second longitudinal structure 50, third longitudinal structure 52, and fourth longitudinal structure 54. Each of first, second, third, and fourth longitudinal structures 48, 50, 52, 54 may have a plurality of primary structural members 56, which may be arranged substantially lengthwise between first end 42 and second end 44. For example, a first set of primary structural members 56 may be connected end-to-end with each other to form first longitudinal structure 48. A second set of primary structural members 56 may be connected end-to-end with each other to form second longitudinal structure 50. A third set of primary structural members 56 may be connected end-to-end with each other to form third longitudinal structure 52. And, a fourth set of primary structural members 56 may be connected end-to-end with each other to form fourth longitudinal structure 54.

Figure 3:
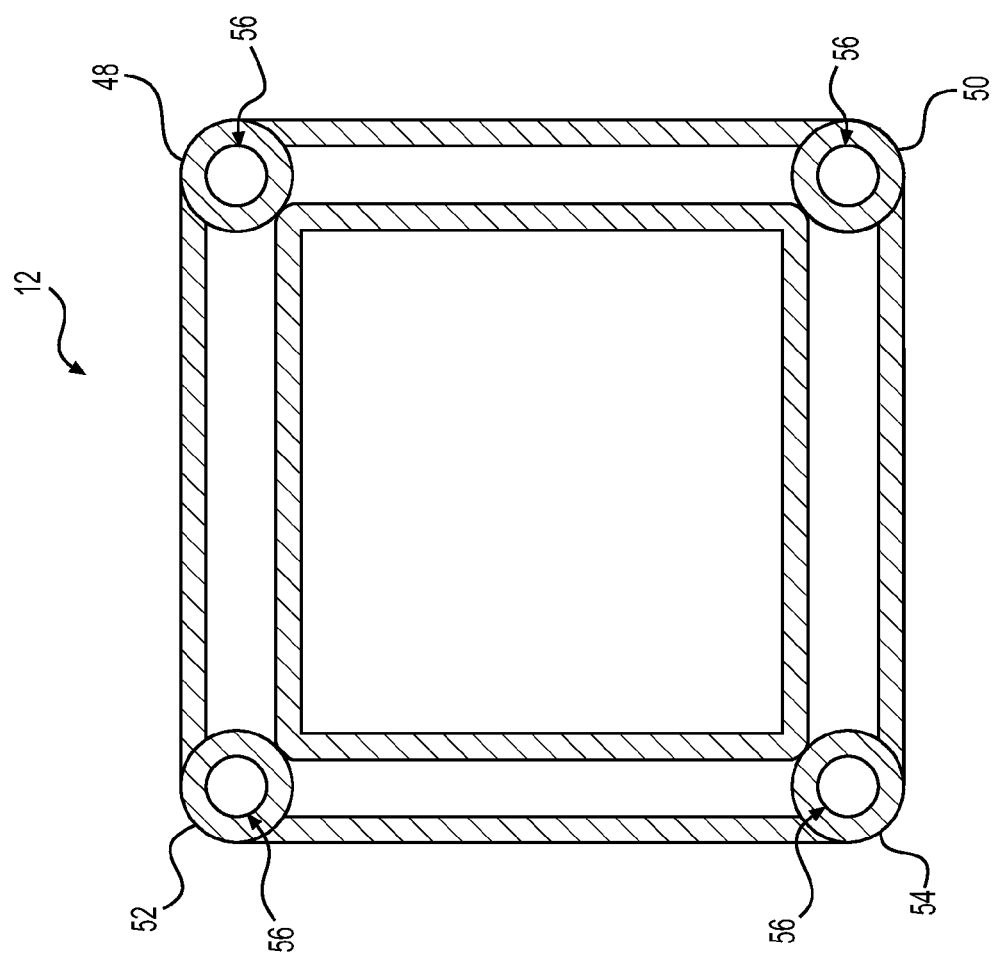
FIG. 3 is a pictorial illustration of a cross-section in a plane generally orthogonal to a longitudinal axis of the exemplary disclosed space frame of FIG. 2.

FIG. 3 illustrates a cross-sectional view of space frame 12 along line A-A (FIG. 2). As illustrated in FIG. 3, between first end 42 and second end 44, first, second, third, and fourth longitudinal structures 48, 50, 52, 54 may be arranged so as to form a substantially rectangular cross section in a plane generally orthogonal to longitudinal axis 46 of machine 10.

Returning to FIG. 2, a plurality of secondary structural members 58 may be connected between primary structural members 56 to form substantially triangulated structures. For example, secondary structural members 58 may be connected between primary structural members 56 to form a substantially triangulated structure 60. In one exemplary embodiment, as shown in FIG. 2, secondary structural member 58 may connect between primary structural members 56 and another secondary structural member 58 to form substantially triangulated structure 62. The use of substantially triangulated structures may help to distribute the weight of a payload carried by machine 10 in bed 22 over an entirety of space frame 12. As used in this disclosure, payload refers to the weight of material carried in bed 22 and excludes the weight of passengers or one or more operators of machine 10. The use of triangulated structures may also help generate primarily axial stresses in primary structural members 56 and secondary structural members 58 as a result of the weight of the payload in bed 22 or because of ground loads reacted by front and rear wheels 14, 16 on space frame 12. As further illustrated in FIG. 2, one or more primary structural members 56 may be connected to each other and to one or more secondary structural members 58 at nodes 64. Rear frame portion 40 may include one or more planar nodes 66 or non-planar nodes 68.

Figure 4:
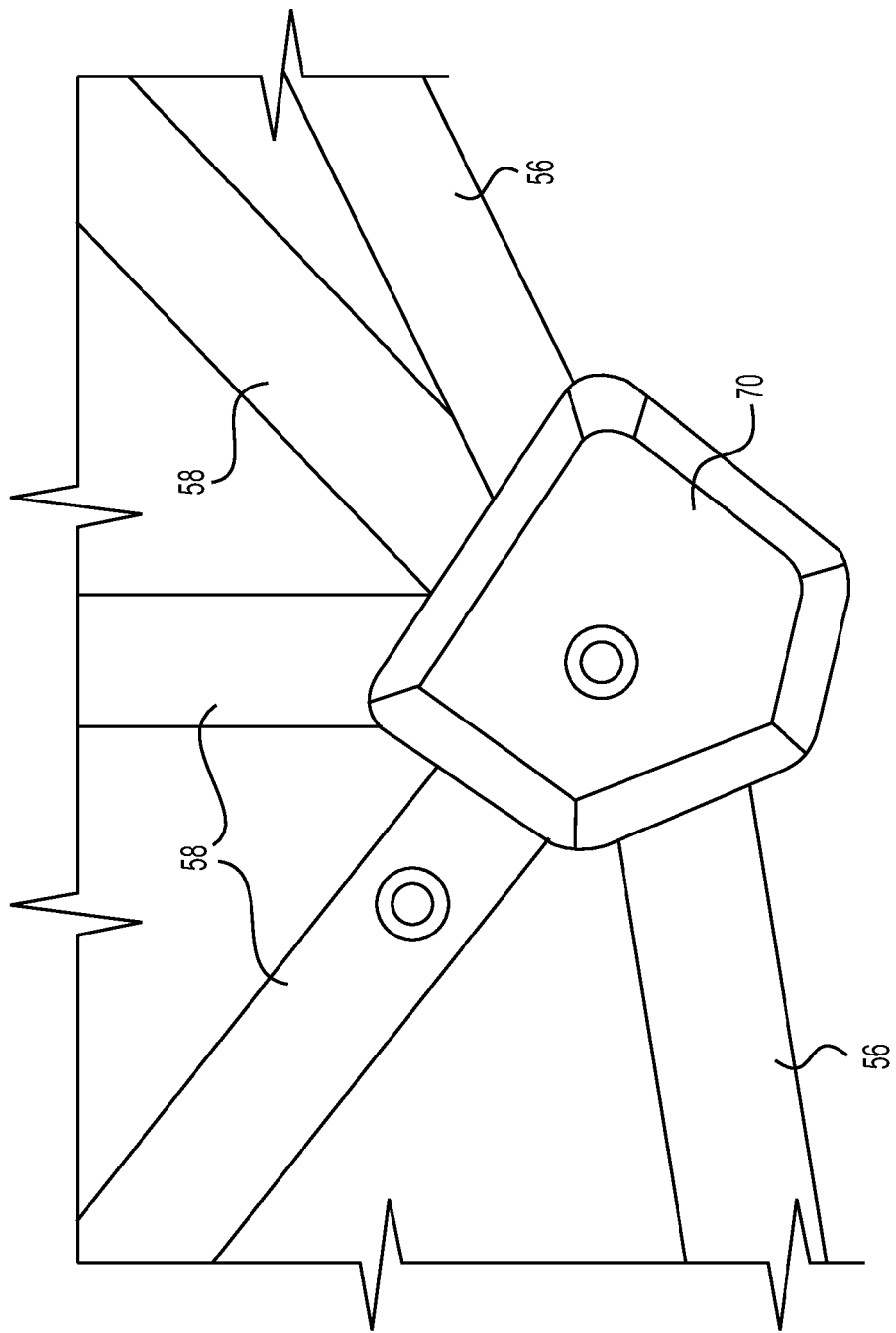
FIG. 4 is a pictorial illustration of an exemplary disclosed planar node of the space frame of FIG. 2.

As illustrated in greater detail in FIG. 4, planar node 66 may connect primary structural members 56 and secondary structural members 58 when primary structural members 56 and secondary structural members 58 lie in one coordinate plane. Planar node 66 may include a connection member 70, which may be configured to connect primary structural members 56 and secondary structural members 58 in one plane while allowing primary structural members 56 and secondary structural members 58 to be oriented in desired angular orientations relative to each other. Connection member 70 may have a triangular, rectangular, polygonal, curvilinear shape, or any other appropriate shape known in the art. Returning to FIG. 2, rear frame portion 40 may have connection member 72, which may have a substantially circular shape and connection member 74, which may have a substantially semicircular shape.

Figure 5:
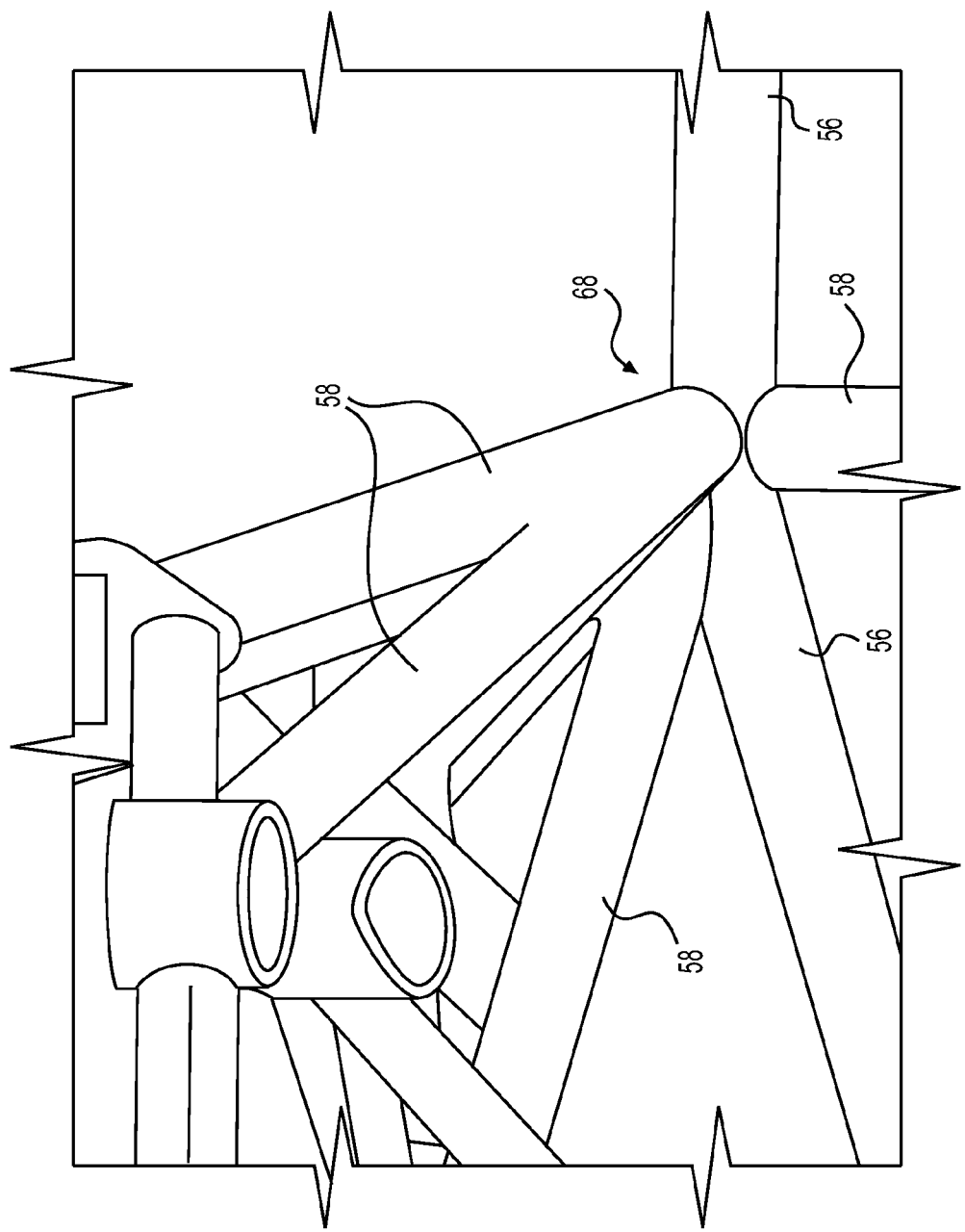
FIG. 5 is a pictorial illustration of an exemplary disclosed non-planar node of the space frame of FIG. 2.

FIG. 5 illustrates a non-planar node 68, which connects primary structural members 56 and secondary structural members 58, when primary structural members 56 and secondary structural members 58 do not lie in one coordinate plane but instead are located in more than one plane.

Returning to FIG. 2, first longitudinal structure 48 and second longitudinal structure 50 may be connected to a first support member 78 at first end 42 of rear frame portion 40. Similarly, third longitudinal structure 52 and fourth longitudinal structure 54 may be connected to second support member 80 at first end 42 of rear frame portion 40. First longitudinal structure 48 and second longitudinal structure 50 may be connected to each other via a first boss 82 at second end 44 of rear frame portion 40. Similarly, third longitudinal structure 52 and fourth longitudinal structure 54 may be connected to each other via a second boss 84 (hidden behind first boss 82) at second end 44 of rear frame portion 40. Thus, first and second longitudinal structures 48 and 50 may form a substantially tapered second end 44. Similarly third and fourth longitudinal structures 52 and 54 may form a substantially tapered second end 44. Substantially triangular planar members 86 may be connected between primary structural members 56, secondary structural member 58, and first boss 82 to form tapered second end 44. A similar triangular planar member 86 may be connected between primary structural members 56 of third and fourth longitudinal structures 52, 54, secondary structural member 58, and second boss 84.

A first hoist 88 and a second hoist 90 may connect bed 22 to first end 42 of rear frame portion 40. First and second hoists 88, 90 may permit bed 22 to be raised or lowered, while pivoting about second end 44 of rear frame portion 40. First and second hoists 88, 90 may be hydraulic actuators, electro-mechanical actuators, or any other type of linear displacement actuators designed to raise or lower bed 22 at first end 42. It is also contemplated that in some exemplary embodiments, first hoist 88 and second hoist 90 may connect bed 22 to front frame portion 100.

Figure 6:
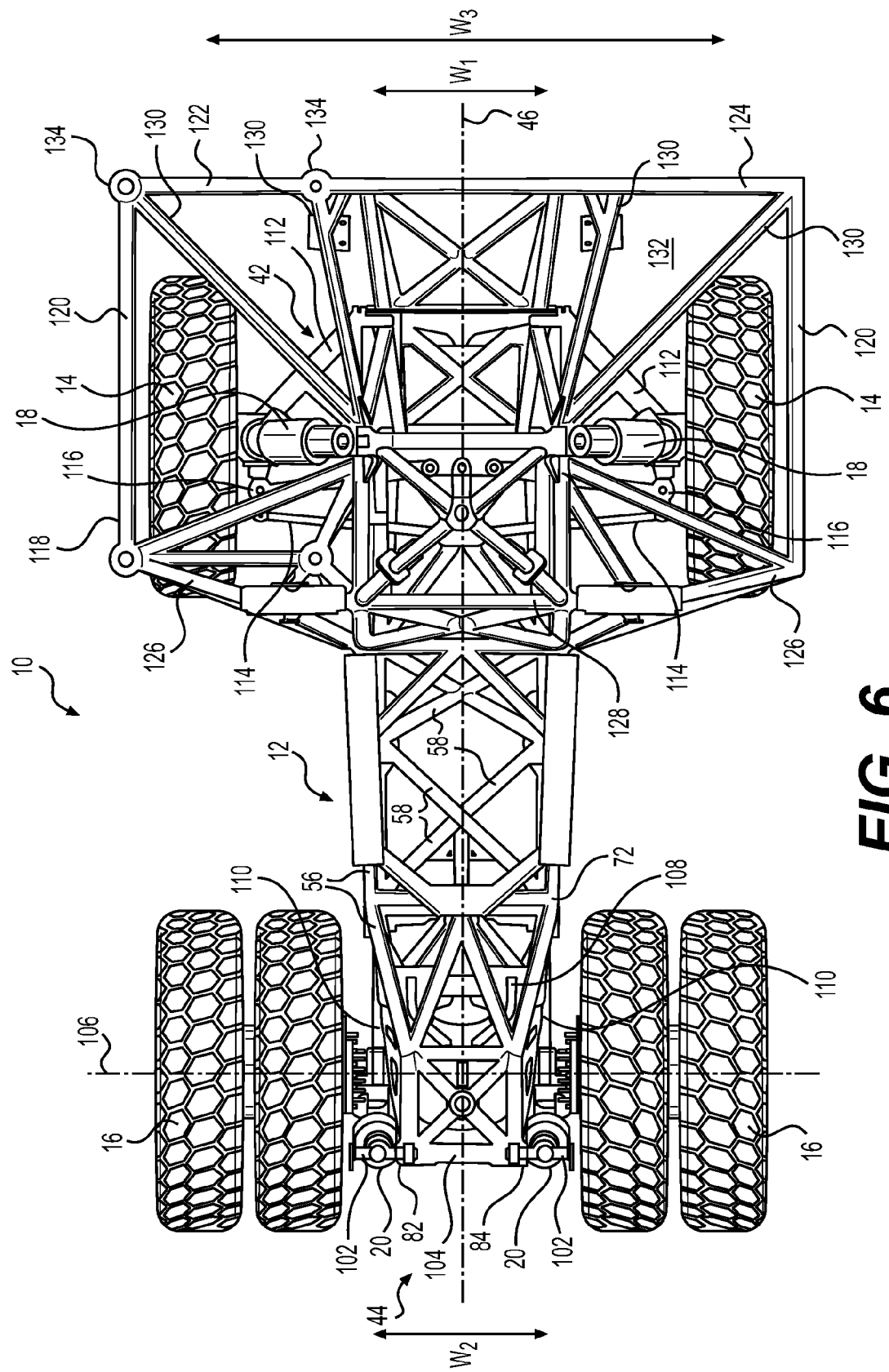
FIG. 6 is a pictorial illustration of a top-view of the exemplary disclosed space frame of FIG. 2.

FIG. 6 illustrates another view of space frame 12 for machine 10 as seen from a top of machine 10 looking down towards the ground. As illustrated in FIG. 6, cross-support member 104 may connect first boss 82 and second boss 84. Bed 22 may be pivotably supported by cross support member 104 to allow bed 22 to rotate around a transverse axis 106 oriented substantially orthogonal to longitudinal axis 46 of machine 10. Bearing members 102 may be attached to first and second bosses 82 and 84 at second end 44 of space frame 12. Rear suspension members 20 may connect bearing members 102 to rear wheels 16. Additional rear suspension members 108, 110 may also connect rear frame portion 40 to rear wheels 16. In one exemplary embodiment, bearing members 102 may help connect primary structural members 56, rear suspension members 20, and bed 22. First end 42 of rear frame portion 40 may be connected to front wheels 14 via front suspension members 18. Additional front suspension members 112, 114, 116 may also connect rear frame portion 40 to front wheels 14. In another exemplary embodiment, spherical plain bearing elements may be used to connect one or more of front suspension members 18,20, rear suspension members 108, 110, 112, 114, 116, first, second, third, and fourth longitudinal structures 48, 50, 52, 54, structural members 56, 58, and/or connection members 70, 72, 74. It is contemplated that spherical plain bearing elements may be used at any of the nodes in space frame 12.

Front frame portion 100 may be configured to support operator cabin 28 and/or prime mover 30. As illustrated in FIG. 6, front frame portion 100 may have a substantially rectangular frame 118. Edge members 120, 122, 124, 126, and 128 may be connected together to form substantially rectangular frame 118. Rectangular frame 118 may be oriented so that a plane formed by edge members 120, 122, 124, 126, and 128 may be substantially parallel to a ground surface supporting front wheels 14. As illustrated in FIG. 6, rear frame portion 40 may have a first width "W1" at first end 42 and a second width "W2" at second end 44. In one exemplary embodiment, as illustrated in FIG. 6, second width W2 may be smaller than first width W1. Further, as illustrated in FIG. 6, rectangular frame 118 may have a third width "W3," which may be larger than W1 and W2. Rectangular frame 118 may be connected to first end 42 of rear frame portion 40 via secondary structural members 130, which may form substantially triangulated structures. For example, edge member 124, and secondary structural members 130 may form substantially triangulated structure 132. Edge members 120, 122, 124, 126, 128 and/or secondary structural members 130 may be connected to each other via nodes 134. In one exemplary embodiment, as illustrated in FIG. 2, nodes 134 may have a cylindrical shape.

Primary structural members 56, secondary structural members 58, 130, edge members 120, 122, 124, 126, 128, first and second support members 78, 80, and cross-support member 104 of space frame 12 may be tubular or solid bars or beams, which may have a circular, elliptical, triangular, square, polygonal, I-shaped, or any other type of cross-section known in the art. Primary structural members 56, secondary structural members 58, 130, edge members 120, 122, 124, 126, 128, first and second support members 78, 80, and cross-support member 104 may be made of metal, metal alloys, reinforced composite materials, or any other type of structural material known in the art. Primary structural members 56, secondary structural members 58, 130, edge members 120, 122, 124, 126, 128, first and second support members 78, 80, and cross-support member 104 may be connected to each other and/or to nodes 64, 66, 68, 134 by permanent attachment means such as welds or via removable attachment means such as bolts, rivets, etc. The geometric arrangement of primary structural members 56, secondary structural members 58, 130, edge members 120, 122, 124, 126, 128, first and second support members 78, 80, and cross-support member 104 may be configured such that space frame 12 may support a payload to space frame weight ratio of greater than or equal to about 9 to 1. As used in this disclosure, space frame weight refers to a weight of space frame 12 of machine 10. For example, space frame 12 of machine 10 weighing 50 tons may allow machine 10 to haul a payload, not including passengers or the operator of machine 10, of at least about 450 tons of material in bed 22. In another exemplary embodiment, the disclosed space frame may support a payload to empty vehicle weight ratio ranging from about 1.2:1 to 2:1. As used in this disclosure, empty vehicle weight refers to a weight of the machine including space frame 12, front wheels 14, rear wheels 16, bed 22, operator cabin 28, prime mover 30, and any other components, which may be a part of machine 10 but without any additional material in bed 22 of machine 10. High payload to empty vehicle weight ratios may be achieved by directly connecting bed 22 to machine 10 and by transferring vertical loads through front suspension members 18,20 and rear suspension members 108, 110, 112, 114 directly to front and rear wheels 14, 16, without transferring the vertical loads to space frame 12.

Figure 7:
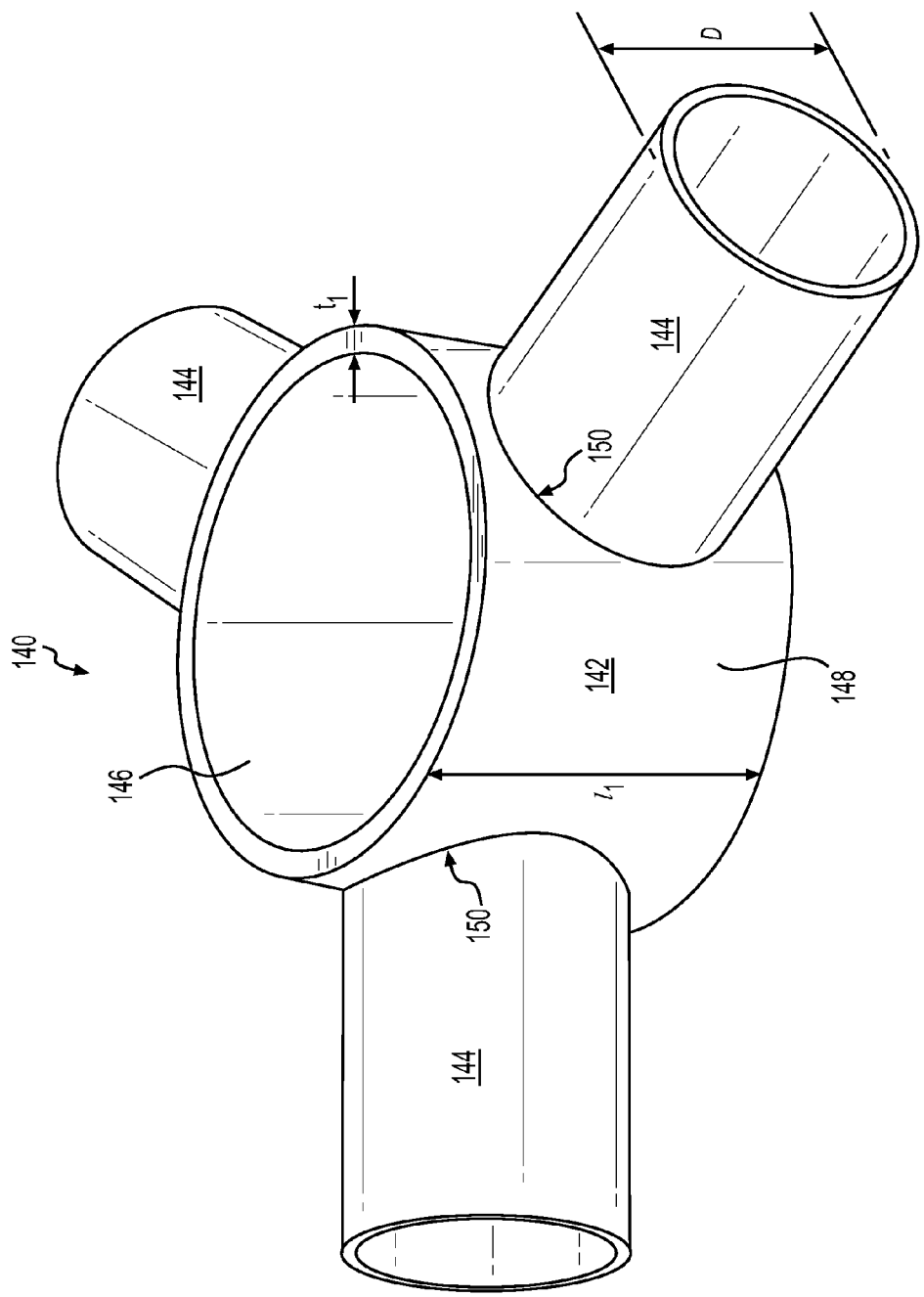
FIG. 7 is a pictorial illustration of an exemplary disclosed node for connecting structural members of the disclosed space frame of FIG. 2.

FIG. 7 illustrates an exemplary embodiment of a node 140, which may be used to connect one or more structural members 144, which may be primary structural members 56 and/or secondary structural members 58. Node 140 may be used at one or more of nodes 66, 72, 74, or 134 (see FIG. 2). Node 140 may include can portion 142, which may have a tubular shape having an inner surface 146 and an outer surface 148. Can portion 142 may have a radial thickness "$t_1$" and a length "$l_1$." Thickness $t_1$ of can portion 142 may be selected so that can portion 142 can withstand the loads exerted on can portion 142 by space frame 12. Length $l_1$ of can portion 142 may be larger than a maximum outer dimension "D" of structural members 144. Structural members 144 may be attached to can portion 142 at ends 150. As illustrated in FIG. 7, ends 150 of structural members 144 may be shaped to conform to outer surface 148 of can 152. Ends 150 may be attached to outer surface 148 using welding, brazing, or any other suitable attachment process known in the art. As used in this disclosure, welding may include arc welding, resistance welding, shot welding, or any other type of welding process known in the art. Although, FIG. 7 illustrates can portion 142 as having an annular shape with a generally circular cross-section, it is contemplated that can portion 142 may have a rectangular, square, triangular, elliptical, polygonal, or any cross-sectional shape known in the art. It is also contemplated that can portion 142 may be formed out of a solid bar having a rectangular, square, triangular, elliptical, polygonal, or any other cross-section known in the art.

Figure 8:
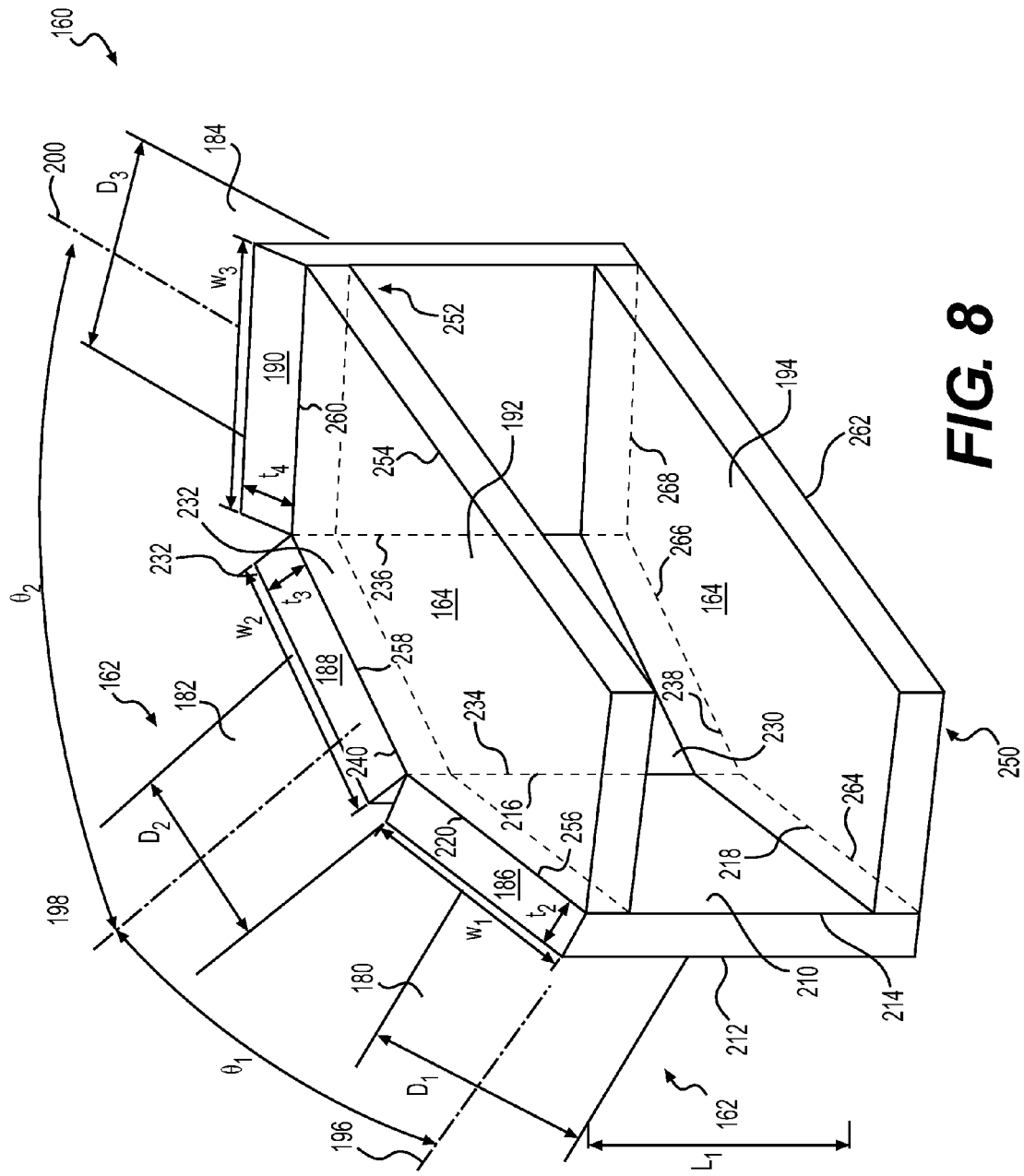
FIG. 8 is a pictorial illustration of another exemplary disclosed node for connecting structural members of the disclosed space frame of FIG. 2.
Figure 9:
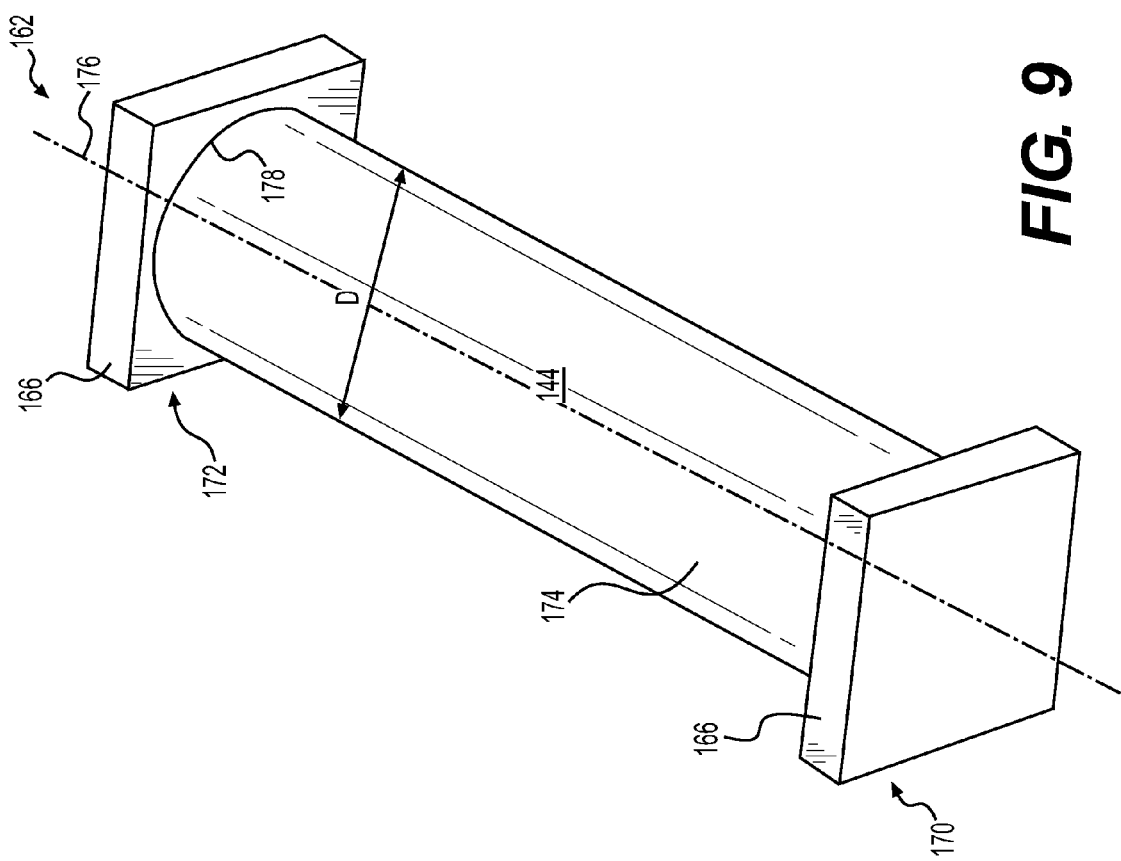
FIG. 9 is a pictorial illustration of an exemplary disclosed sub-assembly for the node of FIG. 8.

FIG. 8 illustrates an exemplary embodiment of a node 160, which may be used to connect one or more structural members 144, which may be primary structural members 56 and/or secondary structural members 58. Node 160 may be used at one or more of nodes 66, 68, 72, 74, or 134 (see FIG. 2). Node 160 may include one or more sub-assemblies 162 and one or more connector plates 164. FIG. 9 illustrates an exemplary embodiment of sub-assembly 162. Each sub-assembly 162 may include a structural member 144 and one or more end plates 166. As illustrated in FIG. 9, structural member 144 may extend from a first end 170 to a second end 172. In one exemplary embodiment, structural member 144 may have an outer surface 174, which may be cylindrical. It is contemplated, however, that outer surface 174 may have any other shape, for example, elliptical, polygonal, I-beam, C-beam, or any other shape known in the art. Outer surface 174 may have a maximum outer dimension D (e.g. diameter, major axis of ellipse, etc.) in a plane generally orthogonal to outer surface 174. End plates 166 may be attached to structural member 144 at first end 170 and second end 172. In one exemplary embodiment end plates 166 may be disposed generally orthogonal to a longitudinal axis 176 of sub-assembly 162. Structural member 144 may be disposed so that outer edges 178 of structural member 144 may abut end plates 166.

Returning to FIG. 8, node 160 may include one or more sub-assemblies 162 attached to each other via connector plates 164. For example, as illustrated in FIG. 8, node 160 may include first structural member 180, second structural member 182, third structural member 184, first end plate 186, second end plate 188, third end plate 190, first connector plate 192, and second connector plate 194. First, second, and third structural members 180, 182, 184 may be similar to structural members 144, which may be primary structural members 56 or secondary structural members 58. First, second, and third structural members 180, 182, 184 may have first, second, and third longitudinal axes 196, 198, 200, respectively. In one exemplary embodiment as illustrated in FIG. 8, first longitudinal axis 196 may be inclined at a first angle "$\theta_1$" relative to second longitudinal axis 198, which may be inclined at a second angle "$\theta_2$" relative to third longitudinal axis 200. First angle $\theta_1$ may be the same as or different from $\theta_2$. First, second, and third structural members may also have maximum outer dimensions "$D_1$," "$D_2$," "$D_3$," respectively, which may be equal or unequal.

First, second, and third end plates 186, 188, 190 may be similar to end plates 166. First end plate 186 may have a first front face 210 and a first rear face 212 disposed opposite first front face 210. First front face 210 may be separated from first rear face 212 by a thickness "$t_2$." First structural member 180 may be attached to first rear face 212 using welding, brazing, or any other suitable attachment process known in the art. In one exemplary embodiment, first structural member 180 may be disposed generally orthogonal to first rear face 212. In another exemplary embodiment, first structural member 180 may be inclined relative to first rear face 212. First front face 210 may extend from a first leading edge 214 to a first trailing edge 216. First front face 210 may also extend from a first proximal edge 218 to a first distal edge 220. In one exemplary embodiment, first end plate 186 may have a generally rectangular shape, so that first leading edge 214 may be disposed generally parallel to first trailing edge 216, first proximal edge 218 may be disposed generally parallel to first distal edge 220, and first leading edge 214 may be disposed generally orthogonal to first proximal edge 218. In this exemplary embodiment, first end plate 186 may have a length "$L_1$" and a width "$W_1$."

Second end plate 188 may have a second front face 230 and a second rear face 232 disposed opposite second front face 230. Second front face 230 may be separated from second rear face 232 by a thickness "$t_3$." Second structural member 182 may be attached to second rear face 232 using welding, brazing, or any other suitable attachment process known in the art. In one exemplary embodiment, second structural member 182 may be disposed generally orthogonal to second rear face 232. In another exemplary embodiment, second structural member 182 may be inclined relative to second rear face 232. Second front face 230 may extend from a second leading edge 234 to a second trailing edge 236. Second front face 230 may also extend from a second proximal edge 238 to a second distal edge 240. In one exemplary embodiment, second end plate 188 may have a generally rectangular shape, so that second leading edge 234 may be disposed generally parallel to second trailing edge 236, second proximal edge 238 may be disposed generally parallel to second distal edge 240, and second leading edge 234 may be disposed generally orthogonal to second proximal edge 238. In this exemplary embodiment, second end plate 188 may have a length $L_1$ and a width "$W_2$," which may be different from width $W_1$ of first end plate 186.

Third end plate 190 may have a structure and function similar to that described above for first end plate 186 and second end plate 188. Third end plate 190 may also have a length $L_1$ and a width "$W_3$," which may be the same as or different from width $W_1$ of first end plate 186 and width $W_2$ of second end plate 188. Length $L_1$ and widths $W_1$, $W_2$, and $W_3$ may be selected to be larger than a maximum of the dimensions $D_1$, $D_2$, and $D_3$ of first, second, and third structural members 180, 182, and 184, respectively. In one exemplary embodiment, first, second, and third end plates 186, 188, and 190 may have a square shape so that length $L_1$ and widths $W_1$, $W_2$, and $W_3$ are about equal. As used in this disclosure, the phrase "about equal" means that the dimensions are equal within manufacturing and machining tolerances known in the art. Although FIG. 8 illustrates first, second, and third end plates 186, 188, and 190 as having a rectangular shape with four edges, it is contemplated that first, second, and third end plates 186, 188, and 190 may have a triangular, polygonal, or any other suitable shape known in the art.

As further illustrated in FIG. 8, first connector plate 192 may extend from third end 250 to a fourth end 252. First connector plate 192 may include a first connector outer edge 254 extending from third end 250 to fourth end 252. First connector plate 192 may also include first attachment edge 256, second attachment edge 258, and third attachment edge 260. First attachment edge 256 may be disposed at an angle relative to second attachment edge 258. Likewise, second attachment edge 258 may be disposed at an angle relative to third attachment edge 260. First attachment edge 256 may be disposed adjacent to first distal edge 220 and may abut first distal edge 220. Likewise, second attachment edge 258 may be disposed adjacent to second distal edge 240 and may abut second distal edge 240. In one exemplary embodiment, first end plate 186, second end plate 188, and third end plate 190 may be connected to first connector plate 192 at first, second, and third attachment edges 256, 258, 260, respectively, using welding, brazing, or any other suitable attachment process known in the art. For example, first attachment edge 256 may be attached to first distal edge 220, using welding, brazing, or any other suitable attachment process known in the art. Likewise, second attachment edge 258 may be attached to second distal edge 240, using welding, brazing, or any other suitable attachment process known in the art. First trailing edge 216 may be disposed adjacent to and may abut second leading edge 234. First trailing edge 216 may be attached to second leading edge 234, using welding, brazing, or any other suitable attachment process known in the art. Likewise, second trailing edge 236 may be attached to third end plate 190, using welding, brazing, or any other suitable attachment process known in the art.

As also illustrated in FIG. 8, second connector plate 194 may extend from third end 250 to fourth end 252. Second connector plate 194 may be disposed generally parallel to and spaced apart from first connector plate 192. Second connector plate 194 may include a second connector outer edge 262 extending from third end 250 to fourth end 252. Second connector plate 194 may also include fourth attachment edge 264, fifth attachment edge 266, and sixth attachment edge 268. Fourth attachment edge 264 may be disposed adjacent to first proximal edge 218 and may abut first proximal edge 218. Likewise, fifth attachment edge 266 may be disposed adjacent to second proximal edge 238 and may abut second proximal edge 238. In one exemplary embodiment, first end plate 186, second end plate 188, and third end plate 190 may be connected to second connector plate 194 at fourth, fifth, and sixth attachment edges 264, 266, 268, respectively, using welding, brazing, or any other suitable attachment process known in the art. For example, fourth attachment edge 264 may be attached to first proximal edge 218, using welding, brazing, or any other suitable attachment process known in the art. Likewise, fifth attachment edge 266 may be attached to second proximal edge 238, using welding, brazing, or any other suitable attachment process known in the art.

Although FIG. 8 illustrates node 160 as having three structural members 180, 182, 184, three end plates 186, 188, 190, and two connector plates 192, 194, it is contemplated that node 160 may include any number of structural members 144, end plates 166, and/or connector plates 164. Additionally, connector plates 164 may be disposed generally parallel to each other or inclined relative to each other between first and second connector plates 192, 194. Further still, additional plates (not shown) may be attached to first, second, and third end plates 186, 188, 190 and to first and second connector plates 192, 194 to strengthen node 160.

Figure 10:
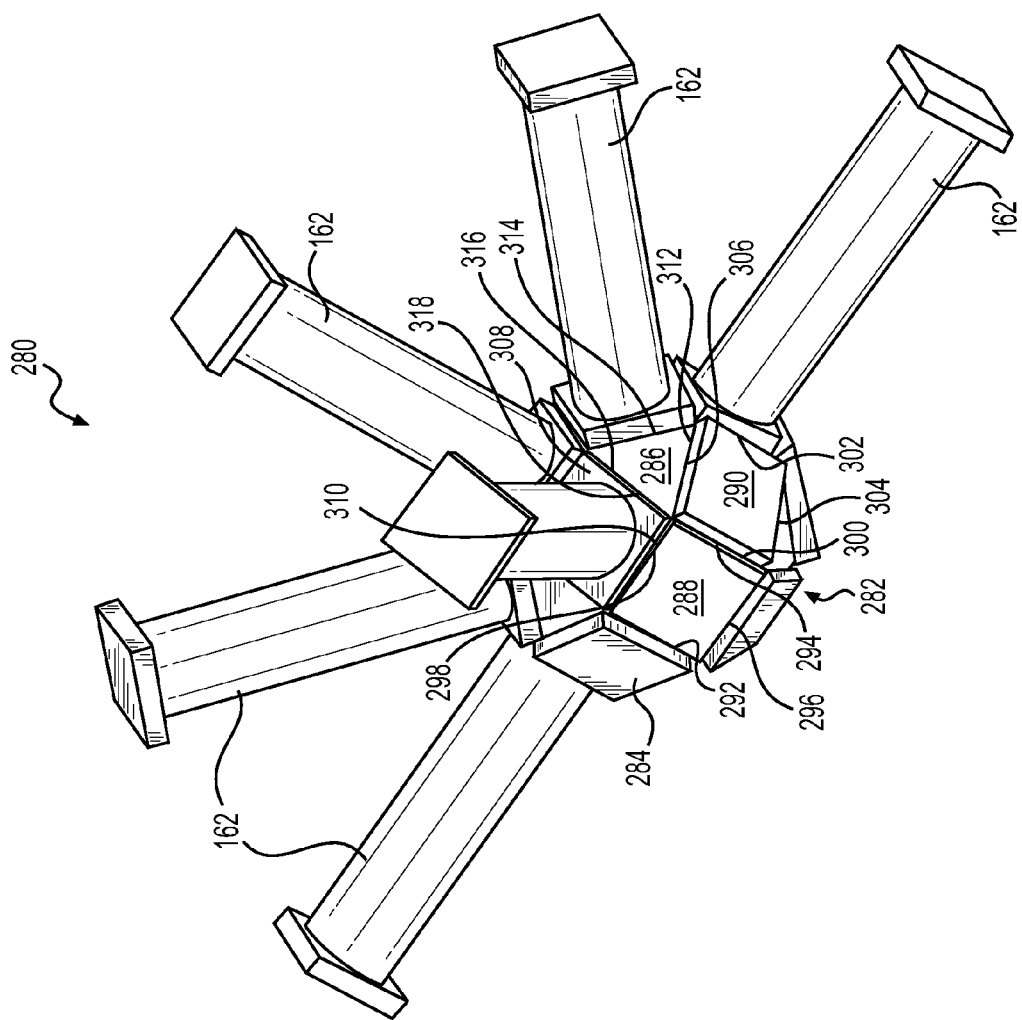
FIG. 10 is a pictorial illustration of another exemplary disclosed node for connecting structural members of the disclosed space frame of FIG. 2.

FIG. 10 illustrates an exemplary embodiment of a node 280, which may be used to connect one or more structural members 144, which may be primary structural members 56 and/or secondary structural members 58. Node 280 may be used at non-planar nodes 68 (see FIGS. 2, 5). Node 280 may include one or more sub-assemblies 162 (see FIG. 9) and core 282. As illustrated in FIG. 10, core 282 may include one or more mounting plates 284 and one or more filler plates 286. Mounting plates 284 may have a structure and function similar to that of end plates 166. For example, mounting plates 284 may serve as end plates 166 and vice-versa. As illustrated in FIG. 10, node 280 may include first mounting plate 288 and second mounting plate 290, both of which may be similar to mounting plates 284. First mounting plate 288 may extend from first mounting plate leading edge 292 to first mounting plate trailing edge 294. First mounting plate 288 may also extend from first mounting plate proximal edge 296 to first mounting plate distal edge 298. Similarly, second mounting plate 290 may extend from second mounting plate leading edge 300 to second mounting plate trailing edge 302. Second mounting plate 290 may also extend from second mounting plate proximal edge 304 to second mounting plate distal edge 306. First mounting plate trailing edge 294 may be disposed adjacent to and may abut second mounting plate leading edge 300. First mounting plate trailing edge 294 may be connected to second mounting plate leading edge 300, using welding, brazing, or any other suitable attachment process known in the art. As illustrated in FIG. 10, third mounting plate 308 may serve as an end plate for sub-assembly 162. Like first and second mounting plates 288, 290, third mounting plate 308 may also be similar to mounting plates 284. A proximal edge 310 of third mounting plate 308 may be disposed adjacent to and may abut first mounting plate distal edge 298. Proximal edge 310 may be attached to first mounting plate distal edge 298 using welding, brazing, or any other suitable attachment process known in the art. First mounting plate 288 and second mounting plate 290 may be inclined relative to each other. Likewise, mounting plates 284 may be inclined relative to each other.

Filler plate 286 may have a generally triangular shape, which may have a first filler edge 312, second filler edge 314, and third filler edge 316. In one exemplary embodiment as illustrated in FIG. 10, first filler edge 312 may be disposed adjacent to and may abut second mounting plate distal edge 306. First filler edge 312 may be attached to second mounting plate distal edge 306 using welding, brazing, or any other suitable attachment process known in the art. Similarly, third filler edge 316 may be disposed adjacent to and may abut a trailing edge 318 of third mounting plate 308. Third filler edge 316 may be attached to trailing edge 318 using welding, brazing, or any other suitable attachment process known in the art. Thus, mounting plates 284 and filler plates 286 may be attached to each other to form core 282. The relative angles of inclination between mounting plates 284 and/or filler plates 286 may be determined based on the relative angles of inclination of sub-assemblies 162. Although FIG. 10 illustrates structural members 144 attached only to mounting plates 284, it is contemplated that structural members 144 may also be attached to filler plates 286. Additionally, although FIG. 10 illustrates filler plates 286 as having a triangular shape, it is contemplated that filler plates 286 may have a square, rectangular, polygonal or any other suitable shape known in the art. Selective placement and inclination of mounting plates 284 and filler plates 286 may allow core 282 to provide a connection between structural members 144 inclined out of plane at any angle.

Figure 11:
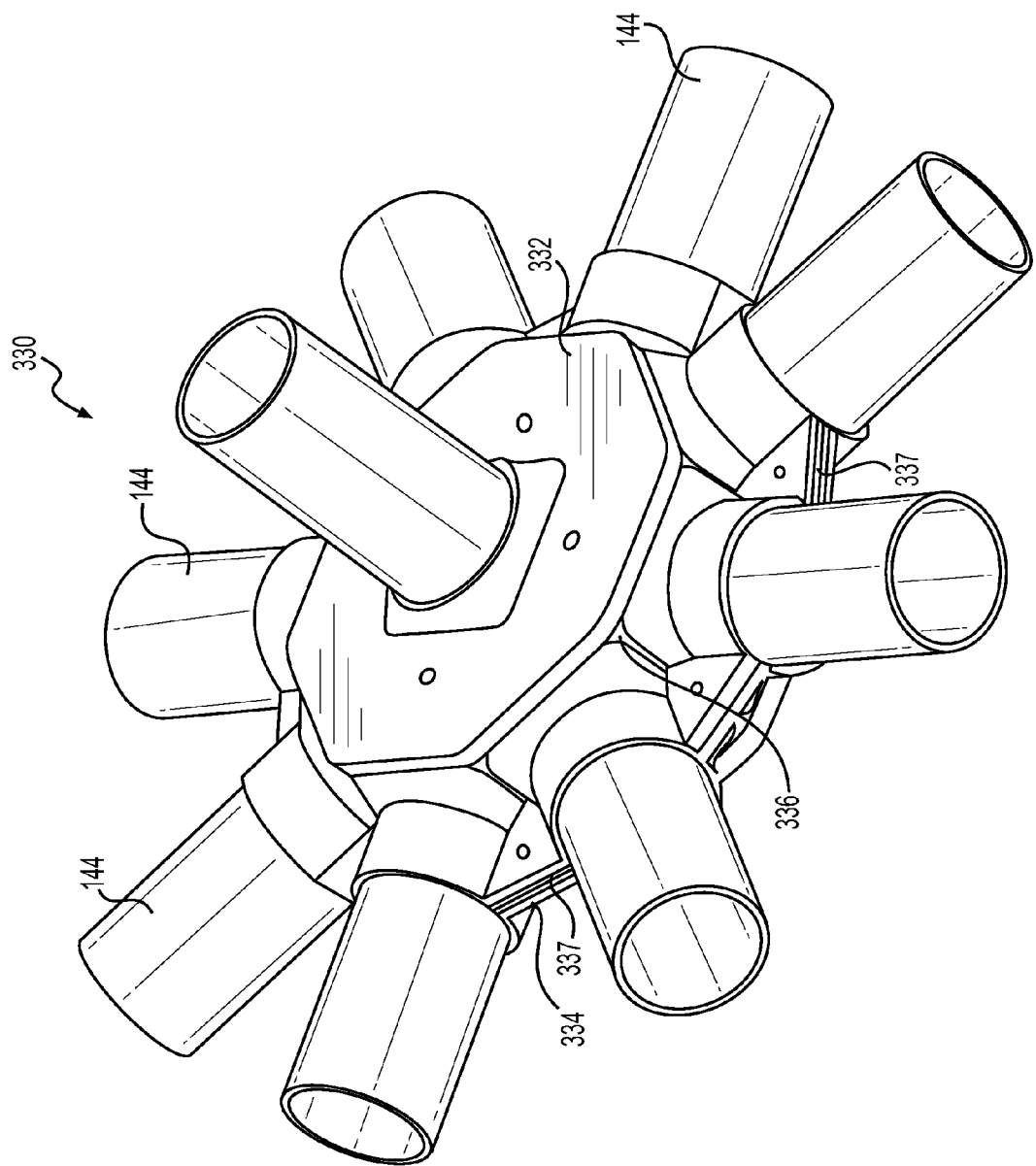
FIG. 11 is a pictorial illustration of another exemplary disclosed node for connecting structural members of the disclosed space frame of FIG. 2.

FIG. 11 illustrates an exemplary embodiment of a node 330, which may be used to connect one or more structural members 144, which may be primary structural members 56 and/or secondary structural members 58. Node 330 may be used at one or more of nodes 66, 68, 72, 74, or 134 (see FIG. 2). Node 330 may include a top cover 332, a bottom cover 334, a core 336 (see also FIG. 14), and one or more fasteners (not shown). Structural members 144 and core 336 may be sandwiched between top cover 332 and bottom cover 334 to form node 330. As shown in FIG. 11, node 330 may also have a small gap 337 between top cover 332 and bottom cover 334. Gap 337 may separate top cover 332 from bottom cover 334 and help ensure that the fasteners can be turned to firmly attach top cover 332 to bottom cover 334. It is also contemplated that top cover 332 may be used in place of bottom cover 334.

Figure 12:
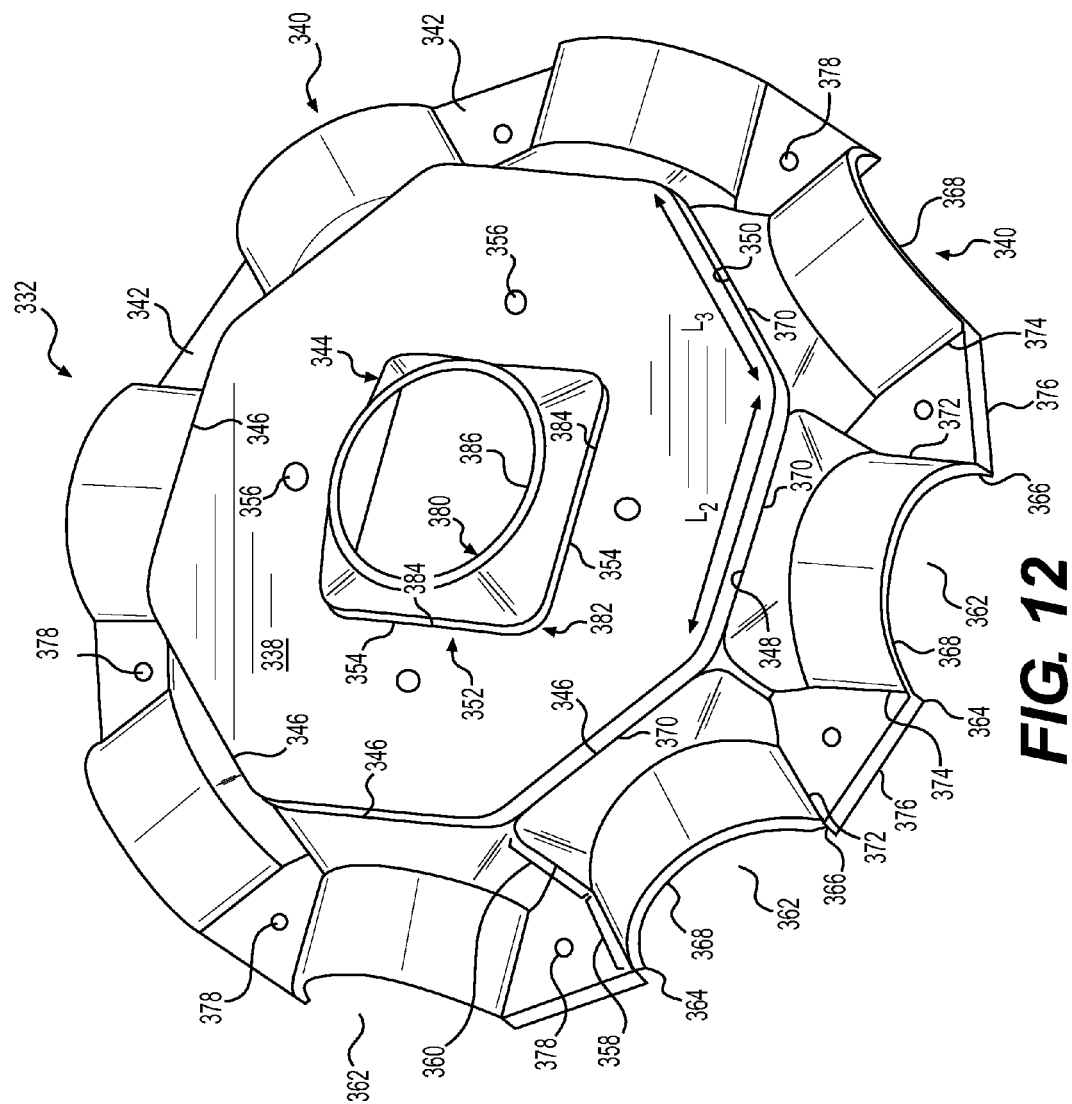
FIG. 12 is a pictorial illustration of an exemplary disclosed top cover for the node of FIG. 11.

FIG. 12 illustrates an exemplary embodiment of top cover 332. Top cover 332 may include top cover plate 338, one or more side sections 340, web sections 342, and an upper connection 344. Top cover plate 338 may be a generally flat plate. Top cover plate 338 may include one or more top cover edges 346, which may be inclined with each other to give top cover plate a polygonal shape. For example, as illustrated in FIG. 12, top cover plate 338 may have an octagonal shape. It is contemplated, however, that top cover plate 338 may have a triangular, rectangular, square, rhomboidal, trapezoidal, or any other suitable shape known in the art. It is also contemplated that top cover edges 346 of top cover plate 338 may have same or different lengths. For example, as illustrated in FIG. 12, top cover plate 338 may include first top cover edge 348 and a second top cover edge 350. First top cover edge 348 may have a first length "$L_4$." Second top cover edge 350 may have a second length "$L_4$," which may be the same as or different from length $L_4$.

Top cover plate 338 may include cutout 352 for receiving upper connection 344. In one exemplary embodiment as illustrated in FIG. 12, cutout 352 may have a generally square shape having cutout edges 354. It is contemplated, however, that cutout 352 may have a rectangular, triangular, rhomboidal, trapezoidal, polygonal, or any other suitable shape known in the art. It is also contemplated that top cover plate 338 may not have cutout 352. Top cover plate 338 may also include one or more holes 356. Holes 356 may be through holes, which may or may not be threaded. Holes 356 may be configured to receive fasteners for attaching top cover 332 with bottom cover 334. In one exemplary embodiment, fasteners may pass through holes 356 and threadingly engage with threads in holes 426 (see FIG. 14) to attach top cover 332 to core 336.

Side sections 340 may be attached to top cover plate 338 at top cover edges 346. Side sections 340 may be formed out of plate sections and may have a recess portion 358 and a transition portion 360. Recess portion 358 may include top recess 362, which may extend from recess leading edge 364 to recess trailing edge 366. Top recess 362 may have a recess inner surface 368 disposed between recess leading edge 364 and recess trailing edge 366. Recess inner surface 368 may be shaped to circumscribe and abut at least a portion of outer surface 174 of structural member 144. In one exemplary embodiment, recess inner surface 368 may have a generally semi-circular shape to receive structural members 144 which may have a cylindrical outer surface 174. It is contemplated, however, that recess inner surface 368 may have a semi-ellipse shape or any other suitable shape configured to circumscribe and abut a portion of outer surface 174 of structural member 144.

Transition portion 360 may extend from recess portion 358 to top cover edge 346. As illustrated in FIG. 12, transition portion 360 may have a transition edge 370 configured to be disposed adjacent to and abutting top cover edge 346. Transition edge 370 of each side section 340 may be attached to top cover edge 346 using welding, brazing, or any other suitable attachment process known in the art.

Web section 342 may be disposed between adjacent side sections 340. In one exemplary embodiment as illustrated in FIG. 12, web sections 342 may have a generally triangular shape having a web leading edge 372, web trailing edge 374, and a web outer edge 376. Web leading edge 372 may be disposed adjacent to and may abut recess trailing edge 366. Web trailing edge 374 may be disposed adjacent to and may abut recess leading edge 364. Web leading edge 372 may be attached to recess trailing edge 366 and web trailing edge 374 may be attached to recess leading edge 364, using welding, brazing, or any other suitable attachment process known in the art. Web section 342 may also include one or more holes 378 disposed between web leading edge 372, web trailing edge 374 and web outer edge 376. Holes 378 may be through holes, which may or may not be threaded. Holes 378 may be configured to receive fasteners for attaching top cover 332 with bottom cover 334. In one exemplary embodiment, holes 378 may receive fasteners that may threadingly engage with holes 426 (see FIG. 14) in core 336 to attach top cover 332 to core 336.

Upper connection 344 may extend from upper end 380 to lower end 382. Upper connection 344 may have a generally square opening defined by edges 384 adjacent lower end 382. It is contemplated, however, that upper connection 344 may have an opening, which may be rectangular, circular, elliptical, triangular, polygonal, or of any other suitable shape known in the art. Edges 384 of upper connection 344 may be disposed adjacent to and may abut corresponding cutout edges 354 in top cover plate 338. Edges 384 may be attached to cutout edges 354 using welding, brazing, or any other suitable attachment process known in the art. Upper connection 344 may have an opening 386 adjacent upper end 380. Opening 386 may have a shape and size suitable to circumscribe and abut outer surface 174 of a structural member 154. Upper connection 344 may be formed out of a single plate using forming and/or casting processes known in the art. Although top cover 332 has been described as having top cover plate 338 attached to one or more side sections 340, one or more web sections 342, and upper connection 344, it is contemplated that top cover 332 may be a single integral piece made by fabricating top cover 332 out of a single plate using forming and/or casting processes known in the art. It is also contemplated that top cover 332, side sections 340, and/or upper connection 344 may be fabricated using a 3D-printing process.

Figure 13:
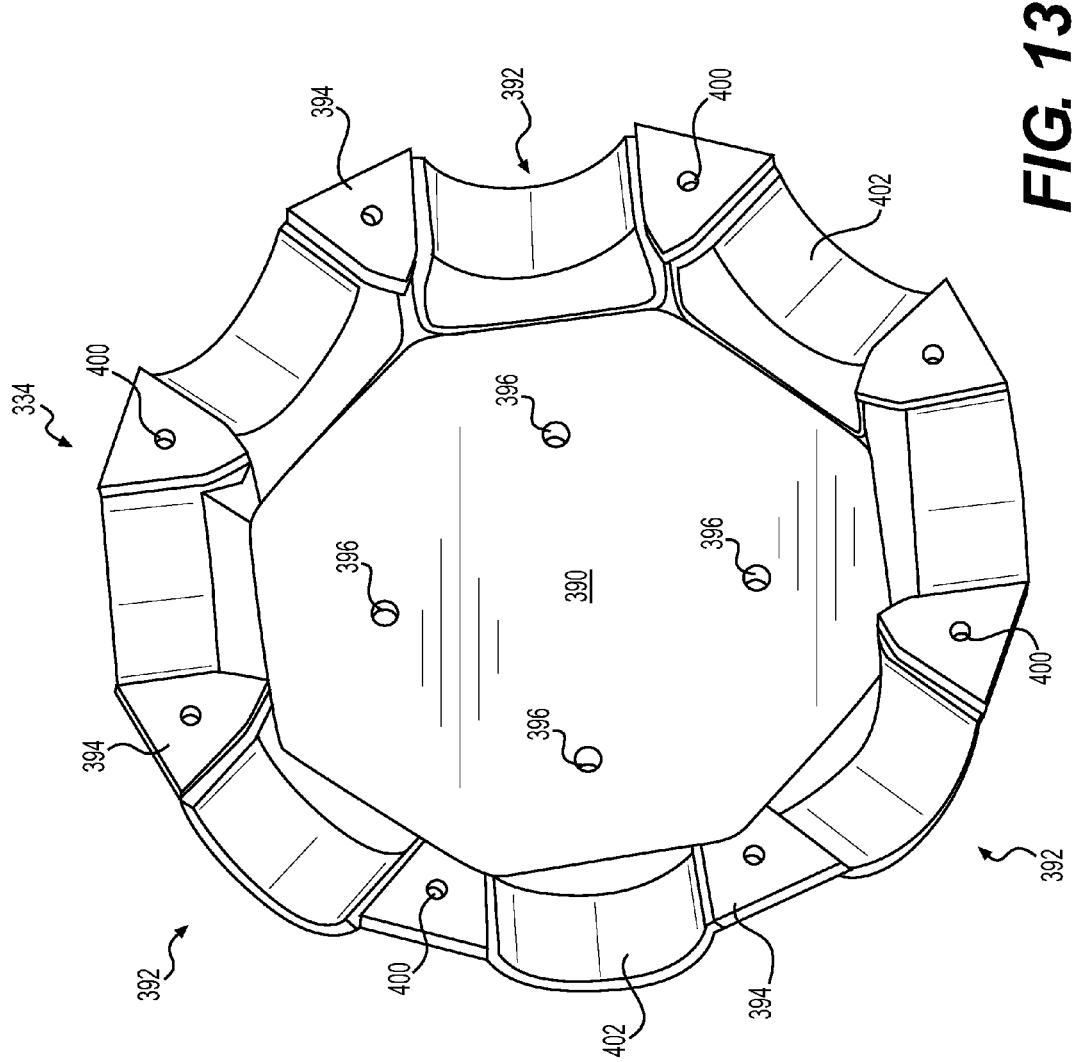
FIG. 13 is a pictorial illustration of an exemplary disclosed bottom cover for the node of FIG. 11.

FIG. 13 illustrates an exemplary embodiment of bottom cover 334. Bottom cover 334 may include bottom cover plate 390, one or more side sections 392, and web sections 394. Bottom cover plate 390, side sections 392, and web sections 394 may have structures and functions similar to top cover plate 338, side sections 340, and web sections 342, respectively. Bottom cover plate 390 may also include holes 396. Holes 396 may be through holes, which may or may not be threaded. Each web section 394 may also include one or more holes 400. Holes 400 may be through holes, which may or may not be threaded. In one exemplary embodiment, fasteners may pass through holes 356 in top cover plate 338 and engage with threads in holes 396 of bottom cover plate 390. In another exemplary embodiment, fasteners may pass through both holes 356 and 396 and engage with a nut (not shown) to attach top cover 332 with bottom cover 334. Fasteners may also pass through holes 378 in top cover plate 338 and engage with threads in holes 400 of bottom cover plate 390. Alternatively, fasteners may pass through holes 378 and 400 and engage with nuts (not shown) to attach top cover 332 with bottom cover 334. In one exemplary embodiment, fasteners may pass through holes 400 in bottom cover 334 and threadingly engage with holes 426 (see FIG. 14) in core 336 to attach bottom cover 334 to core 336. Like top cover 332, side sections 392 of bottom cover 334 may include bottom recesses 402 configured to circumscribe and abut outer surface 174 of structural members 144. Bottom recess 402 may have a structure and function similar to top recess 362. Bottom cover 334 may be manufactured using processes similar to those described above for top cover 332.

Figure 14:
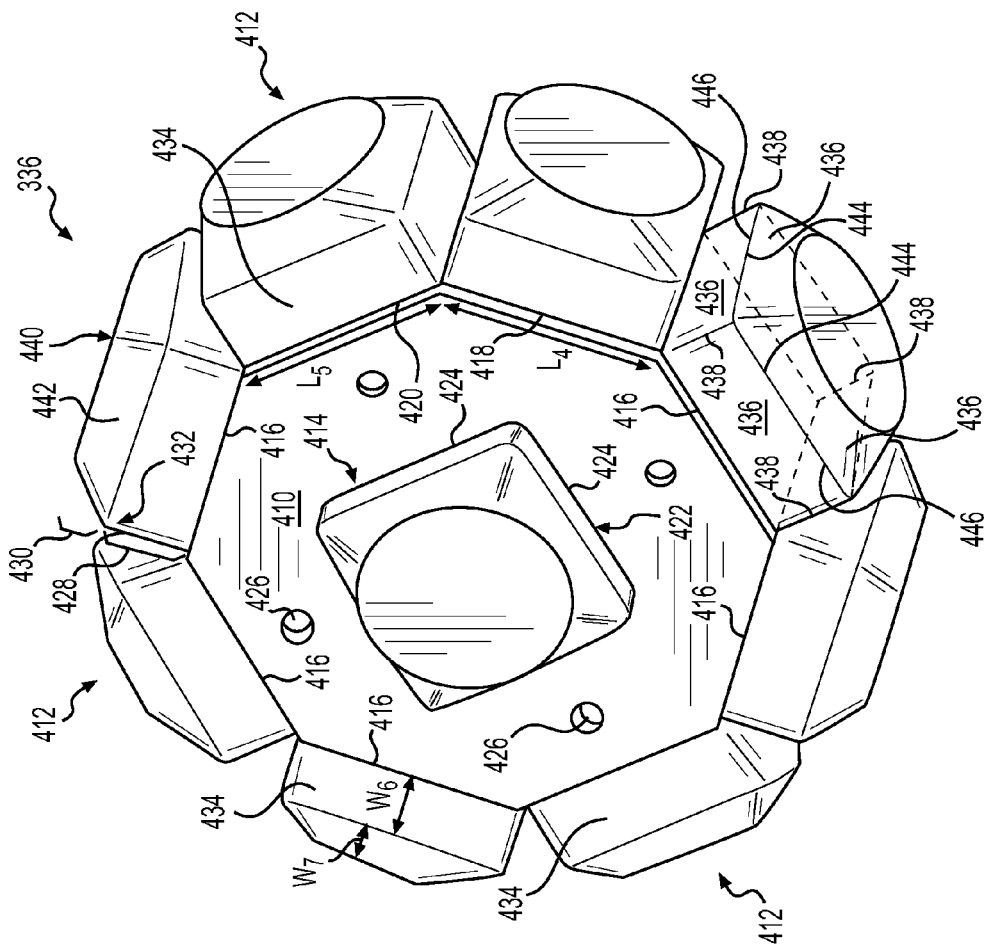
FIG. 14 is a pictorial illustration of an exemplary disclosed core for the node of FIG. 11.

FIG. 14 illustrates an exemplary embodiment of core 336, which may be disposed between top cover 332 and bottom cover 334. Core 336 may include core cover plate 410, core bottom plate (not shown), projections 412, and core upper connection 414. Core cover plate 410 may be a generally flat plate. Core cover plate 410 may include one or more core cover edges 416, which may be inclined with each other to give core cover plate 410 a polygonal shape. For example, as illustrated in FIG. 14, core cover plate 410 may have an octagonal shape. It is contemplated, however, that core cover plate 410 may have a triangular, rectangular, polygonal, or any other suitable shape known in the art. In one exemplary embodiment, core cover plate 410 may have a shape similar to that of top cover plate 338 and/or bottom cover plate 390. It is further contemplated that core cover edges 416 of core cover plate 410 may have same or different lengths. For example, as illustrated in FIG. 14, core cover plate 410 may include first core cover edge 418 and a second core cover edge 420. First core cover edge 418 may have a first length "$L_4$." Second core cover edge 420 may have a second length "$L_5$," which may be the same as or different from length $L_4$.

Core cover plate 410 may include cutout 422 for receiving core upper connection 414. In one exemplary embodiment as illustrated in FIG. 14, cutout 422 may have a generally square shape having cutout edges 424. It is contemplated, however, that cutout 422 may have a rectangular, triangular, polygonal, or any other suitable shape known in the art. It is also contemplated that core cover plate 410 may not have cutout 422. Core cover plate 410 may include one more through holes 426, which may be configured to allow fasteners (not shown) to pass through for attaching top cover 332 with bottom cover 334.

Projections 412 may be attached to core cover plate 410 at core cover edges 416. Projections 412 may have a body portion 428 and a lead-in portion 430. In one exemplary embodiment as illustrated in FIG. 14, a width "$W_6$" of body portion 428 may be larger than a width "$W_7$" of lead in portion 430. It is contemplated, however, that width $W_6$ may be equal to or smaller than width $W_7$. Body portion 428 may have a generally annular shape having a square or rectangular cross-section. Body portion 428 may extend from core cover edge 416 outward to body portion end 432. Body portion 428 may have an outer surface 434. In one exemplary embodiment, body portion 428 may include, for example, plates 436 attached to each other along edges 438 of plates 436. It is also contemplated that body portion 428 may be a portion of a tubular member having a generally rectangular or square cross-section. Although body portion 428 has been described as having a rectangular or square cross-section made up of plates 436, it is contemplated that body portion 428 may have a cross-section having a shape that may be triangular, circular, ellipsoidal, polygonal, or any other suitable shape known in the art so that body portion may conform to a shape of structural members 144.

Lead-in portion 430 may extend outward from body portion end 432 to an outer end 440. As illustrated in FIG. 14, lead-in portion 430 of projection 412 may have a first cross-section adjacent outer end 440, which may be smaller than a second cross-section of lead-in portion 430 adjacent body portion end 432. Lead-in portion 430 may also have smooth and/or curvilinear outer surface 442 disposed between body portion end 432 and outer end 440. The relatively smaller cross-section of lead-in portion 430 adjacent outer end 440 and the curvilinear shape of outer surface 442 may help ensure that projection 412 is slidingly received within structural member 144. Lead-in portion 430 may have transition edges 444. Plates 436 may also have edges 446. Transition edges 444 of body portion 432 may be configured to be disposed adjacent to and abutting edges 446 of plates 436. Transition edges 444 may be attached to edges 446 using welding, brazing, or any other suitable attachment process known in the art. Like body portion 428, lead-in portion 430 may also have a shape that may conform to a shape of structural members 144. Although, core 336 has been described above as having core cover plate 410 attached to one or more projections 412 and to core upper connection 414, it is contemplated that core 336 may be a single integral piece made by forming core 336 out of a single plate using forming and/or casting processes known in the art. It is also contemplated that core 336, projections 412, and/or core upper connection 414 may be formed using a 3D-printing process.

Figure 15:
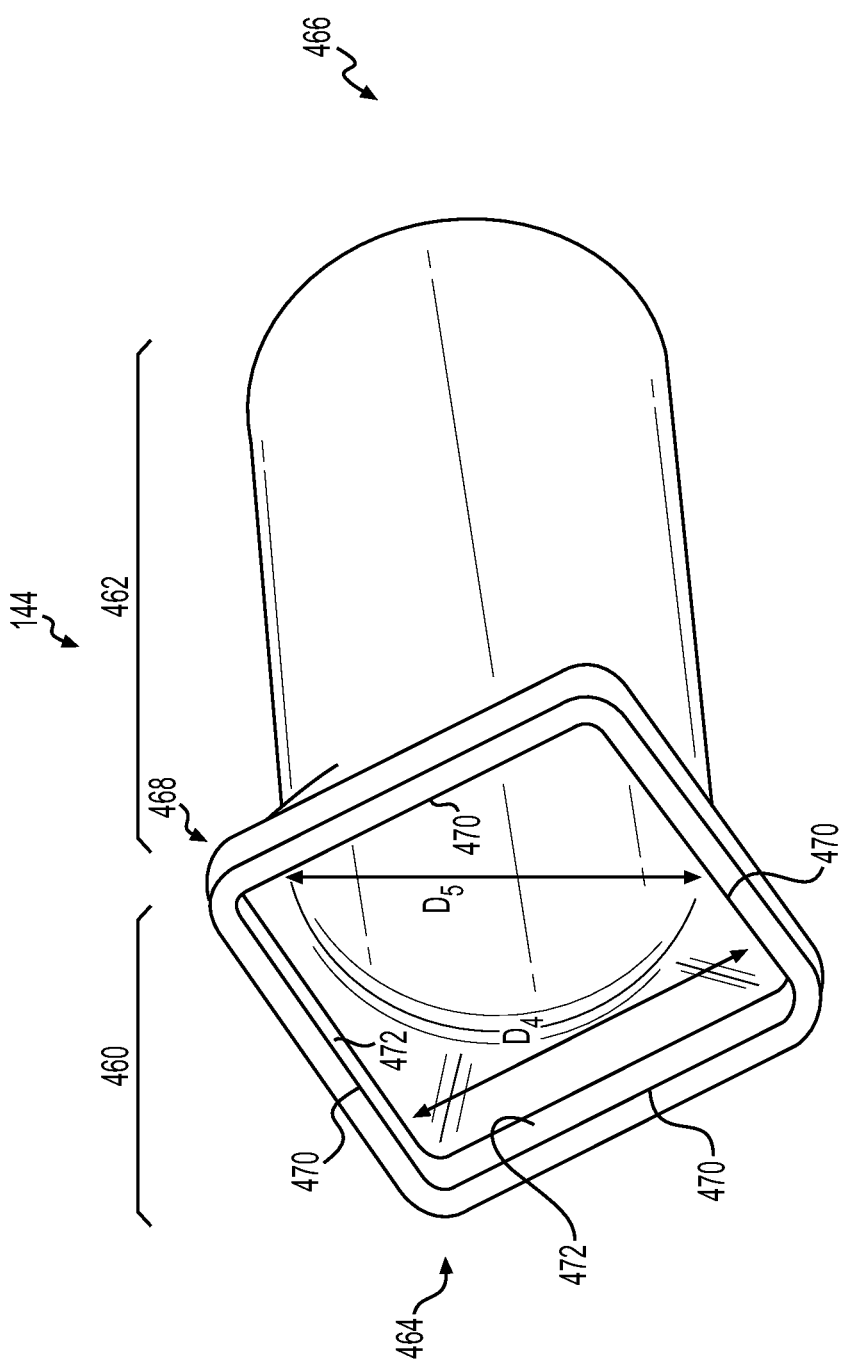
FIG. 15 is a pictorial illustration of an exemplary disclosed structural member for use with the node of FIG. 11.

FIG. 15 illustrates an exemplary embodiment of structural member 144 configured to be used with node 330. As illustrated in FIG. 15, structural member 144 may have a node attach portion 460 and a body portion 462. Structural member 144 may extend from front end 464 to rear end 466. Node attach portion 460 may extend from front end 464 to distal end 468 disposed between front end 464 and rear end 466. Node attach portion 460 of structural member 144 may have a non-circular cross-section. For example, as illustrated in FIG. 15, node attach portion 460 may have a generally square or rectangular cross-section having edges 470. The different edges 470 of node attach portion 460 may have the same or different lengths. It is also contemplated that node attach portion 460 may have a cross-section having a triangular, elliptical, polygonal, or any other suitable non-circular shape known in the art. Node attach portion 460 may have an node attach inner surface 472, which may be configured to abut and circumscribe outer surface 434 of projection 412. Node attach inner surface 472 may have a maximum width or diameter "$D_4$," which may be larger than a minimum inner dimension "$D_5$" of body portion 462 of structural member 144. Node attach portion 460 may be created using stamping, hydro-forming, or other processes known in the art. In one exemplary embodiment, node attach portion 460 may be fabricated separately and attached to body portion 462, using welding, brazing, or any other suitable attachment process known in the art.

Figure 16:
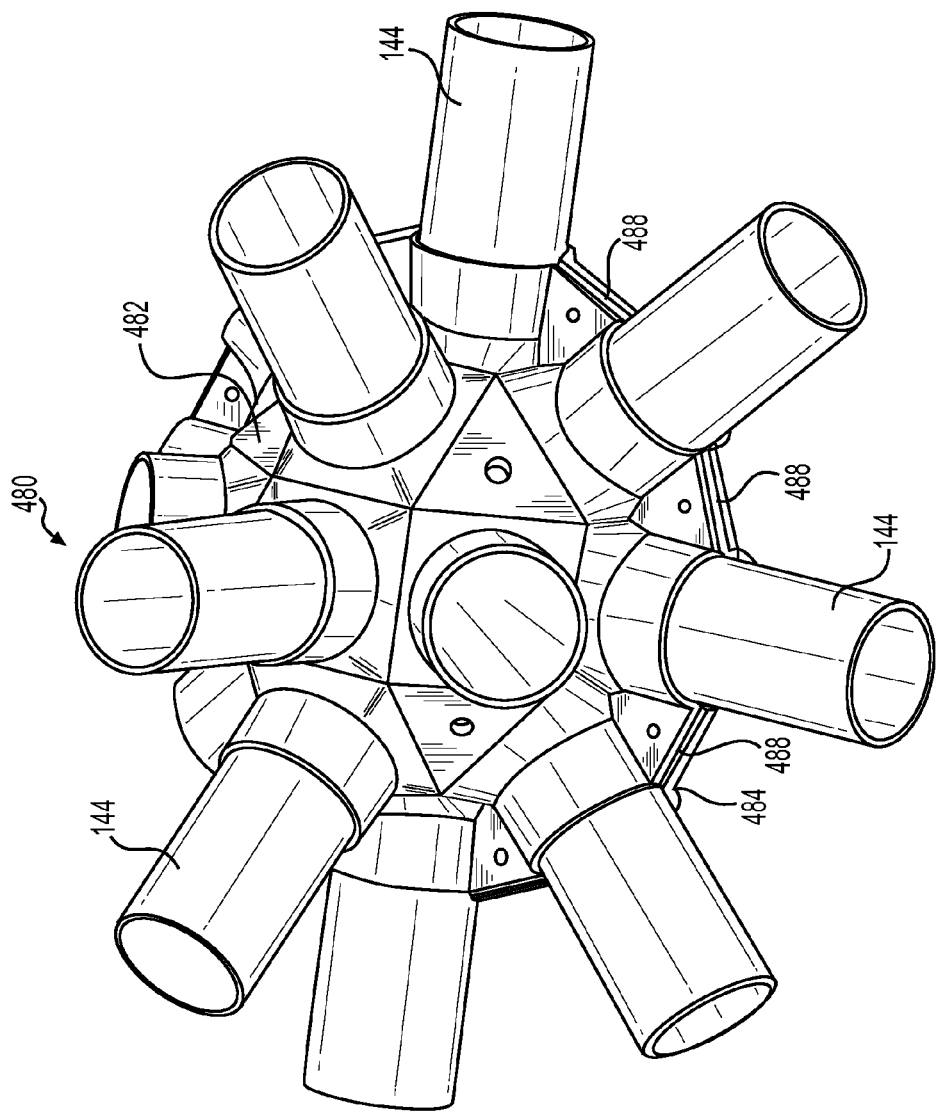
FIG. 16 is a pictorial illustration of another exemplary disclosed node for connecting structural members of the disclosed space frame of FIG. 2.

FIG. 16 illustrates another exemplary embodiment of a node 480, which may be used to connect one or more structural members 144, which may be primary structural members 56 and/or secondary structural members 58. Node 480 may be used at non-planar nodes 68 (see FIGS. 2, 5). Node 480 may include a top cover 482, a bottom cover 484, a core 486 (see FIG. 19), and one or more fasteners (not shown). Structural members 144 may be sandwiched between top cover 482 and bottom cover 484 to form node 480. As shown in FIG. 16, node 480 may also have a small gap 488 between top cover 482 and bottom cover 484. Gap 488 may help ensure that the fasteners can be used to firmly attach top cover 482 to bottom cover 484 or to attach top cover 482 and bottom cover 484 separately to core 486.

Figure 17:
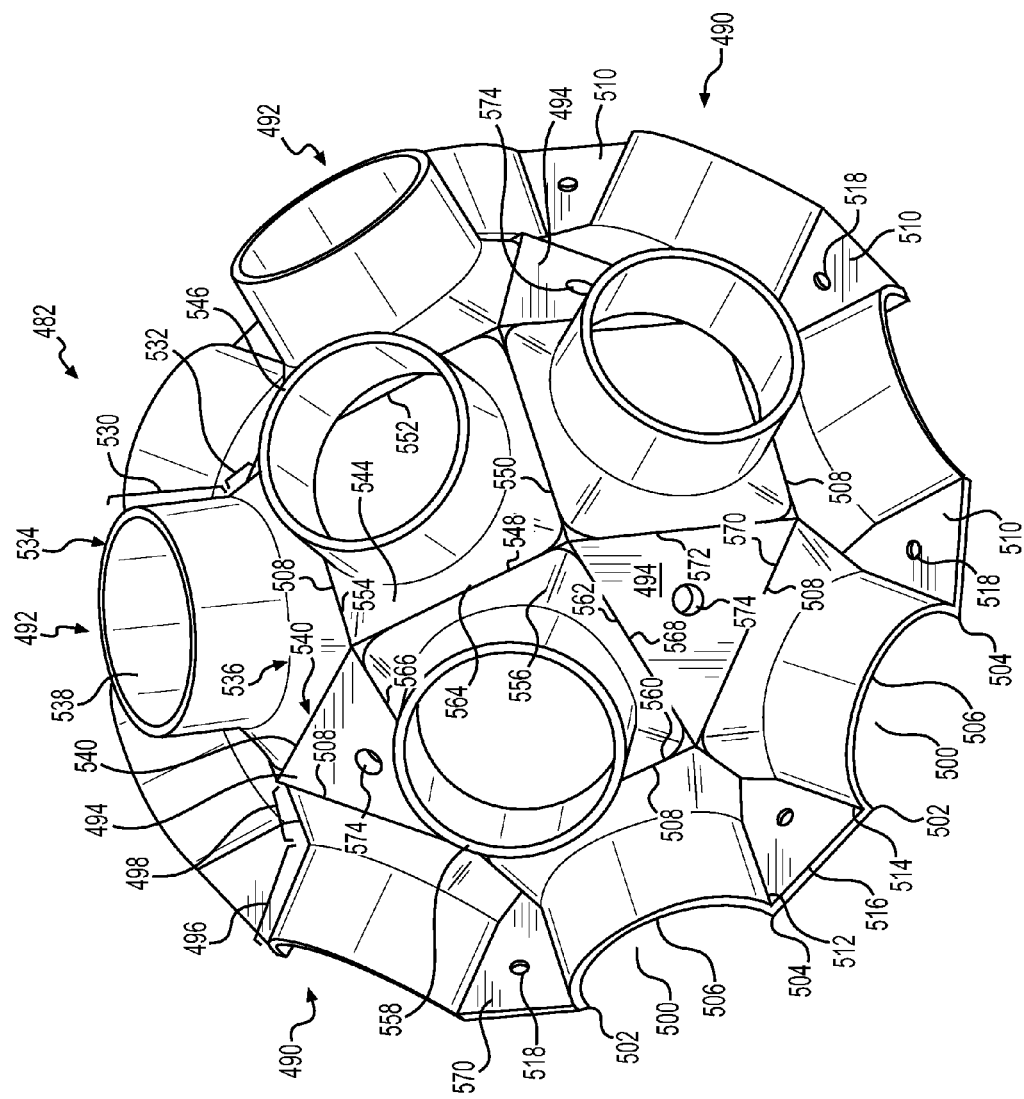
FIG. 17 is a pictorial illustration of an exemplary disclosed top and/or bottom cover for the node of FIG. 16.

FIG. 17 illustrates an exemplary embodiment of top cover 482. Top cover 482 may include one or more side sections 490, upper connections 492, and filler plates 494. Side sections 490 may be formed out of plate sections and may have a recess portion 496 and a transition portion 498. Recess portion 496 may include top recess 500, which may extend from recess leading edge 502 to recess trailing edge 504. Top recess 500 may have a recess inner surface 506 disposed between recess leading edge 502 and recess trailing edge 504. Recess inner surface 506 may be shaped to circumscribe and abut at least a portion of outer surface 174 of structural member 144. In one exemplary embodiment, recess inner surface 506 may have a generally semi-circular shape to receive structural members 144 which may have a cylindrical outer surface 174. It is contemplated, however, that recess inner surface 506 may have a semi-ellipse shape or any other suitable shape configured to circumscribe and abut a portion of outer surface 174 of structural member 144. Transition portion 498 may extend from recess portion 496 to transition edge 508.

Web section 510 may be disposed between adjacent side sections 490. In one exemplary embodiment as illustrated in FIG. 17, web sections 510 may have a generally triangular shape having a web leading edge 512, web trailing edge 514, and a web outer edge 516. Web leading edge 512 may be disposed adjacent to and may abut top recess trailing edge 504. Web trailing edge 514 may be disposed adjacent to and may abut top recess leading edge 502. Web leading edge 512 may be attached to recess trailing edge 504 using welding, brazing, or any other suitable attachment process known in the art. Web trailing edge 514 may be attached to recess leading edge 502 in a similar manner. Web section 510 may also include one or more holes 518 disposed between web leading edge 512, web trailing edge 514 and web outer edge 516. Holes 518 may be through holes, which may or may not be threaded. Holes 518 may be configured to receive fasteners for attaching top cover 482 with bottom cover 484.

Upper connection 492 may include a guiding portion 530 and an attachment portion 532. Guiding portion 530 may have a generally annular shape extending from a front end 534 to a rear end 536. In one exemplary embodiment as illustrated in FIG. 17, guiding portion 530 may have an inner surface 538, which may have a generally circular cross-section. It is contemplated, however, that inner surface 538 may have an elliptical, triangular, rectangular, polygonal, or any other suitable cross-section known in the art. Inner surface 538 of guiding portion may have a shape that may conform to a shape of outer surface 174 of structural member 154 so that inner surface 538 may circumscribe and slidingly abut outer surface 174.

Attachment portion 532 may extend from rear end 536 to attachment portion end 540. Attachment portion 532 may have one or more edges 542 adjacent attachment portion end 540. In one exemplary embodiment as illustrated in FIG. 17, attachment portion 532 may have a generally square cross-section, defined by edges 542, adjacent attachment portion end 532. One or more edges 542 of attachment portion 532 of an upper connection 492 may be disposed adjacent to and may abut one or more edges 542 of attachment portion 532 of an adjacent upper connection 492. For example, first attachment portion 544 of first upper connection 546 may have edges 548, 550, 552, 554. Likewise, second attachment portion 556 of second upper connection 558 may have edges 560, 562, 564, 566. It is contemplated that edges 548, 550, 552, 554 and edges 560, 562, 564, 566 may have the same or different lengths. As illustrated in FIG. 17, edge 548 of first attachment portion 544 may be disposed adjacent to and may abut edge 564 of second attachment portion 556. Edge 548 may be attached to edge 564 using welding, brazing, or any other suitable attachment process known in the art.

Filler plate 494 may have a generally triangular shape, which may have a first filler edge 568, second filler edge 570, and third filler edge 572. In one exemplary embodiment as illustrated in FIG. 17, first filler edge 568 may be disposed adjacent to and may abut edge 562 of second attachment portion 556. First filler edge 568 may be attached to edge 562 using welding, brazing, or any other suitable attachment process known in the art. Thus, upper connections 492 and filler plates 494 may cooperate to help connect structural members 144 inclined out of plane at any angle. Filler plate 494 may also include one or more holes 574. Holes 574 may be through holes, which may or may not be threaded. Holes 574 may be configured to receive fasteners for attaching top cover 482 with bottom cover 484. Bottom cover 484 of node 480 may have a structure and function similar to bottom cover 334 of node 330. It is also contemplated that in some exemplary embodiments, top cover 482 may be used instead of bottom cover 484 to provide connections to additional structural members 144 that may be inclined out of plane.

Figure 18:
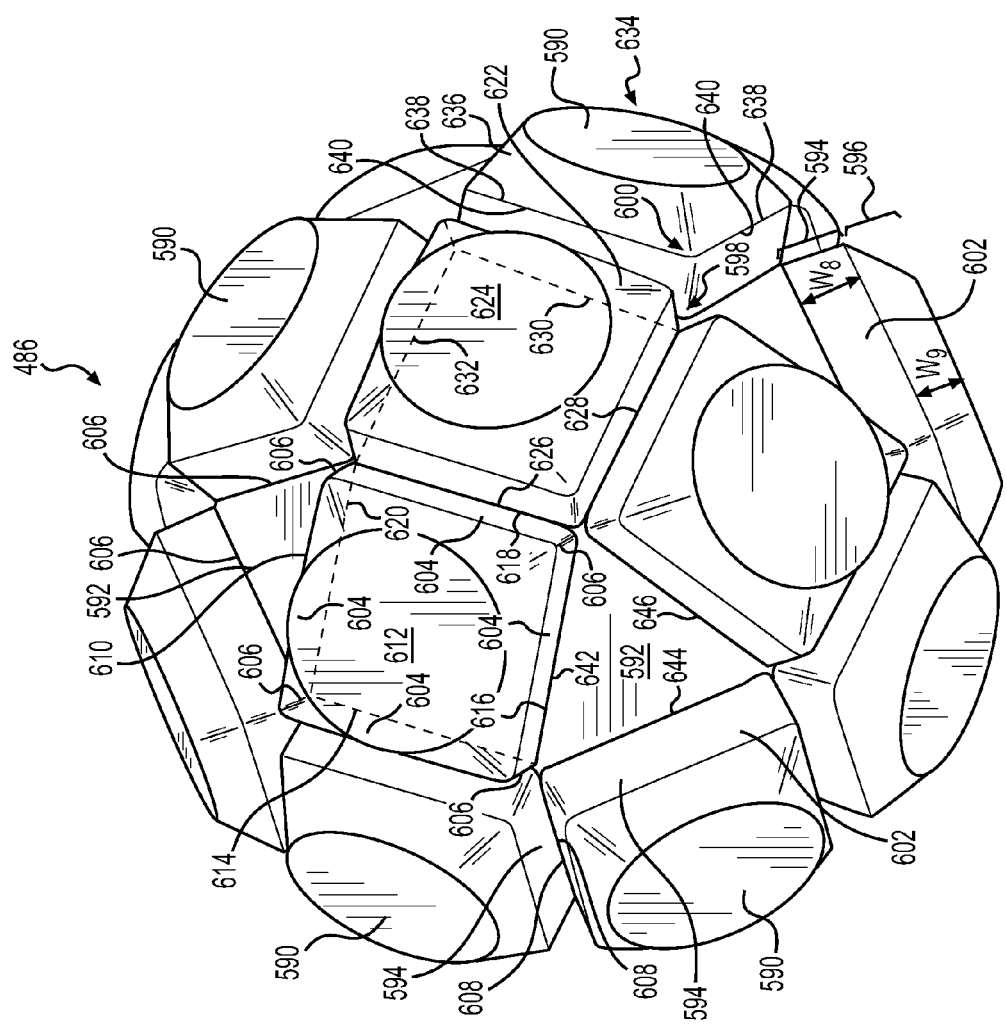
FIG. 18 is a pictorial illustration of an exemplary disclosed core for the node of FIG. 16.

FIG. 18 illustrates an exemplary embodiment of core 486, which may be disposed between top cover 482 and bottom cover 484. Core 486 may include projections 590 and filler plates 592. Projections 590 may have a body portion 594 and a lead-in portion 596. In one exemplary embodiment as illustrated in FIG. 14, a width "$W_8$" of body portion 594 may be larger than a width "$W_9$" of lead in portion 596. It is contemplated, however, that width $W_8$ may be equal to or smaller than width $W_9$. Body portion 594 may extend outward from body portion bottom end 598 to body portion top end 600. Body portion 594 may have an outer surface 602. Body portion 594 may have a generally annular shape, which may have a square or rectangular cross-section. Body portion In one exemplary embodiment as illustrated in FIG. 18, body portion 594 may include, for example, plates 604 attached to each other along edges 606 of plates 604. It is also contemplated that body portion 594 may be a portion of a tubular member having a generally rectangular cross-section. Although body portion 594 has been described as having a rectangular or square cross-section made up of plates 604, it is contemplated that body portion 428 may have a cross-section having a shape that may be triangular, circular, ellipsoidal, polygonal, or any other suitable shape known in the art so that body portion may conform to a shape of structural members 144.

Body portion 594 may have one or more edges 608. As illustrated in FIG. 18, one or more edges 608 of body portion 594 of one projection 590 may be disposed adjacent to and may abut one or more edges 608 of body portion 594 of an adjacent projection 590. For example, first body portion 610 of first projection 612 may have edges 614, 616, 618, 620. Likewise, second body portion 622 of second projection 624 may have edges 626, 628, 630, 632. It is contemplated that edges 614, 616, 618, 620 and edges 626, 628, 630, 632 may have the same or different lengths. As illustrated in FIG. 18, edge 618 of first body portion 610 may abut edge 626 of second body portion 622. Edge 618 may be attached to edge 626 using welding, brazing, or any other suitable attachment process known in the art.

Lead-in portion 596 may extend outward from body portion top end 600 to an outer end 634. As illustrated in FIG. 18, lead-in portion 596 of projection 590 may have a first cross-section adjacent outer end 634, which may be smaller than a second cross-section of lead-in portion 596 adjacent body portion top end 600. Lead-in portion 596 may also have smooth and/or curvilinear outer surface 636 disposed between body portion top end 600 and outer end 634. The relatively smaller cross-section at outer end 634 and the curvilinear shape of outer surface 636 may help ensure that projection 590 may be slidingly received within node attach portion 460 (see FIG. 15) of structural member 144. Lead-in portion 596 may have transition edges 638 configured to be disposed adjacent to and abutting body portion edges 640. Transition edges 638 may be attached to body portion edges 640 using welding, brazing, or any other suitable attachment process known in the art. Like body portion 594, lead-in portion 596 may also have a shape that may conform to a shape of structural members 144.

Filler plate 592 may have a generally triangular shape, which may have a first filler edge 642, second filler edge 644, and third filler edge 646. In one exemplary embodiment as illustrated in FIG. 18, first filler edge 642 may be disposed adjacent to and may abut edge 616 of first body portion 610 of first projection 612. First filler edge 642 may be attached to edge 616 using welding, brazing, or any other suitable attachment process known in the art. Thus, projections 590 and filler plates 592 may cooperate to orient projections 590 to connect structural members 144 disposed out of plane at any angle using node 480. Although core 486 has been described above as having projections 590 and filler plates 592 attached to each other, it is contemplated that core 486 may be a single integral piece made by forming core 486 using forming and/or casting processes known in the art. It is also contemplated that core 486 and/or projections 590 may be formed using a 3D-printing process.

Figure 19:
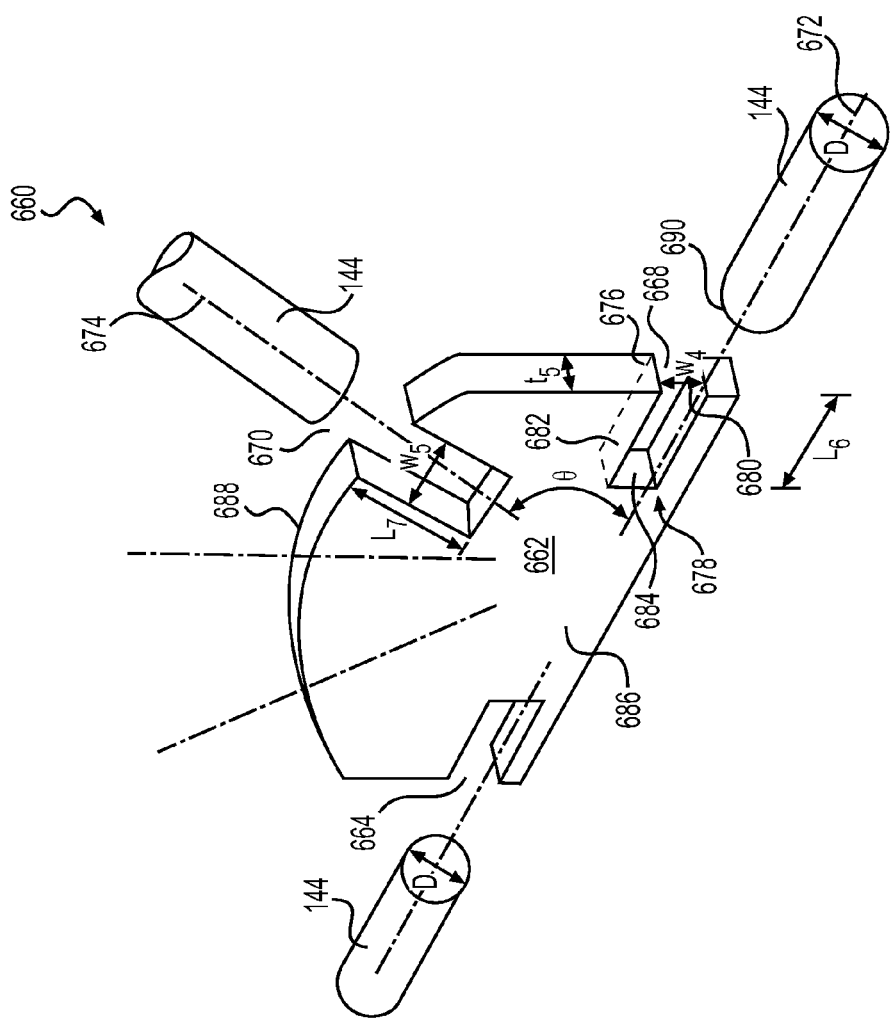
FIG. 19 is a pictorial illustration of another exemplary disclosed node for connecting structural members of the disclosed space frame of FIG. 2.

FIG. 19 illustrates another exemplary embodiment of a node 660, which may be used to connect one or more structural members 144, which may be primary structural members 56 and/or secondary structural members 58. Node 660 may be used at one or more of nodes 66, 68, 72, 74, or 134 (see FIG. 2). Node 660 may include connector block 662, which may be a generally flat plate. Connector block 662 may have a thickness "$t_5$," which may be larger than a maximum outer dimension D of structural members 144. Connector block 662 may have one or more slots 664. For example, as illustrated in FIG. 19, connector block 662 may have a first slot 668 and a second slot 670. First slot 668 may have a first longitudinal axis 672 and second slot 670 may have a second longitudinal axis 674. In one exemplary embodiment as illustrated in FIG. 2, first longitudinal axis 672 may be inclined at an angle ϕ relative to second longitudinal axis 674. First slot 668 may extend from outer edge 676 of connector block 662 to first slot end 678. First slot 668 may have a first inner surface 680 extending from outer edge 676 to first slot end 678. First slot 668 may also have a second inner surface 682 disposed opposite first inner surface 680 and extending from outer edge 676 to first slot end 678. First slot 668 may have a third inner surface 684 disposed adjacent first slot end 678 and extending between first inner surface 680 and second inner surface 682. In one exemplary embodiment as illustrated in FIG. 19, first, second, and third inner surfaces 680, 682, 684 may extend from front face 686 of connector block 662 to rear face 688 of connector block 662. It is contemplated, however, that slots 664 may not extend from front face 686 to rear face 688 and instead may take the form of holes or recesses. First slot 668 may have a first width "$W_4$," which may be selected to ensure that first slot 668 may slidingly receive structural member 144. An end 690 of structural member 144 may be disposed adjacent to and may abut third inner surface 684. End 690 may be attached to third inner surface 684 using welding, brazing, or any other suitable attachment process known in the art.

Second slot 670 may have a structure similar to first slot 668. Structural member 144 may be received and attached to an inner surface of second slot 670 in a manner similar to that for first slot 668. Second slot 670 may have a second width "$W_5$," which may be selected to ensure that second slot 670 may slidingly receive structural member 144. In one exemplary embodiment first width $W_4$ may be different from second width $W_5$. First slot 668 may have a first length "$L_6$" and second slot 670 may have a second length "$L_7$," which may be the same as or different from length $L_6$. By orienting slots 664 at different angles, node 660 may allow structural members 144 to be connected with each other via connector block 662 at any angle in one plane. It is contemplated, however, that structural members 144 may also be attached to front face 686 or rear face 688 of connector block 662 to provide out-of-plane connections between structural members 144.

Figure 20:
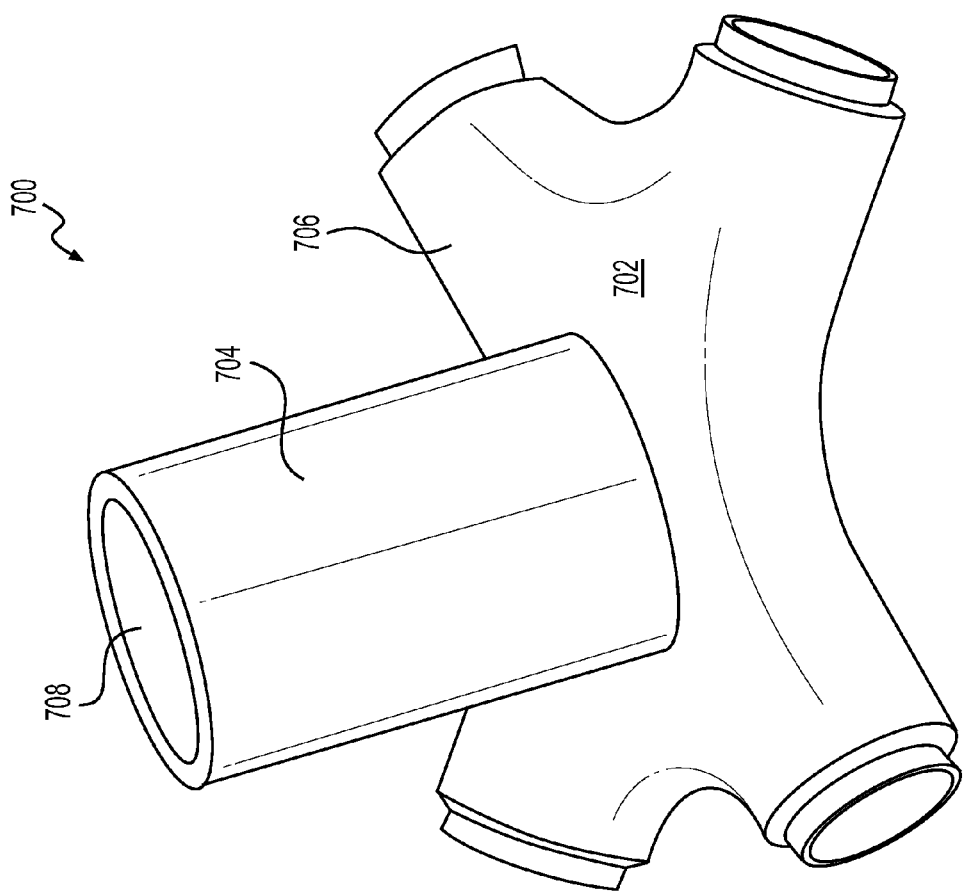
FIG. 20 is a pictorial illustration of another exemplary disclosed node for connecting structural members of the disclosed space frame of FIG. 2.
Figure 21:
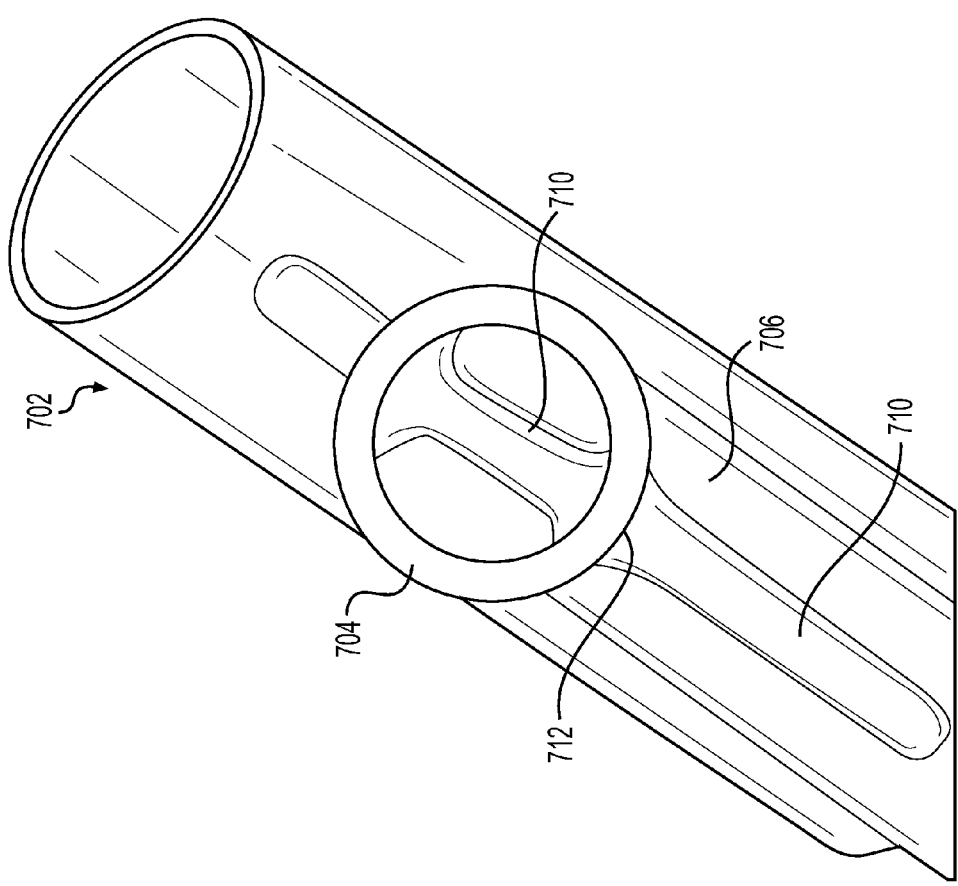
FIG. 21 is a pictorial illustration of exemplary disclosed ribs for the node of FIG. 20.

FIG. 20 illustrates another exemplary embodiment of a node assembly 700, which may be used to connect one or more structural members 144, which may be primary structural members 56 and/or secondary structural members 58. Node assembly 700 may be used at one or more of nodes 66, 68, 72, 74, or 134 (see FIG. 2). Node assembly 700 may include a node 702 and a socket 704. Node 702 may include any of nodes 140, 160, 280, 330, 480, 660. Socket 704 may be attached to an outer surface 706 of node 702. Socket 704 may have a generally annular shape, which may have an inner surface 708 configured to slidingly receive and circumscribe an outer surface 174 (see FIG. 9) of structural member 144. Inner surface 708 of socket 704 may have a cross-section, which may be circular, elliptical, triangular, rectangular, polygonal, or may have any suitable shape that can conform to a shape of outer surface 174. As illustrated in FIG. 21, socket 704 may also include one or more internal ribs 710, which may help to strengthen socket 704. As also illustrated in FIG. 21, ribs 710 may be external to socket 704 and may connect outer surface 706 of node 702 with and outer surface 712 of socket 704. Although FIG. 21 illustrates socket 704 with ribs 710, it is contemplated that in some exemplary embodiments, socket 704 may not include ribs 710. Socket 704 may be fabricated using a 3D-printing process directly on outer surface 706 of node 702. Alternatively, socket 704 may be fabricated using 3D-printing, casting, molding, etc. and may be attached to outer surface 706 of node 702 using welding, brazing, or any other suitable attachment process known in the art.

Figure 22:
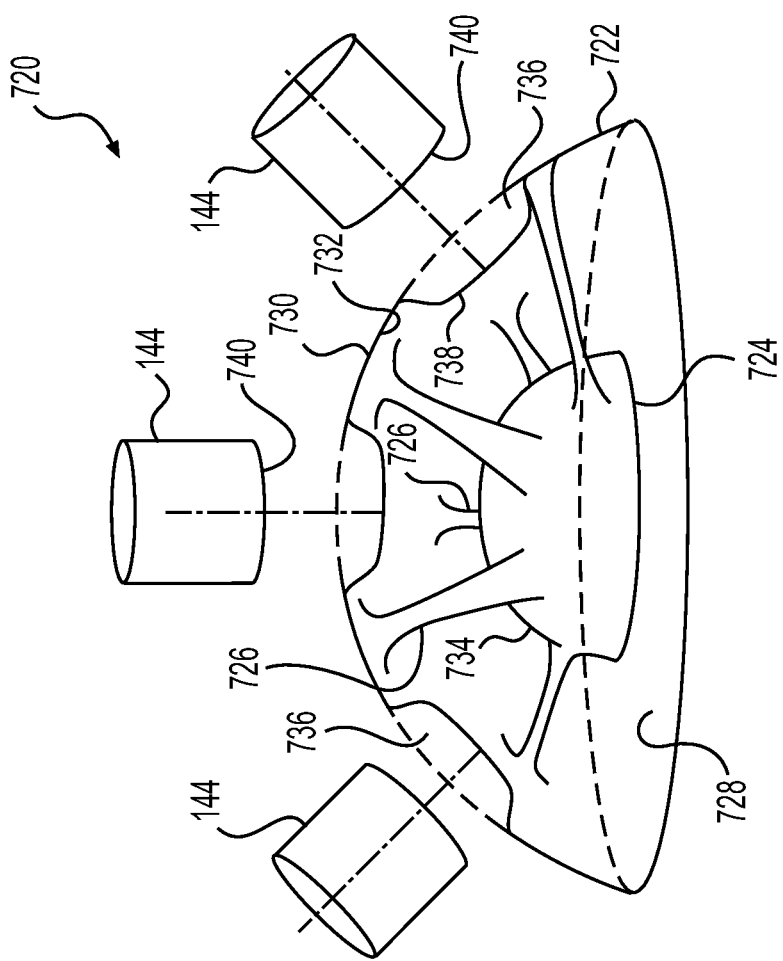
FIG. 22 is a pictorial illustration of another exemplary disclosed node for connecting structural members of the disclosed space frame of FIG. 2.

FIG. 22 illustrates another exemplary embodiment of a node 720, which may be used to connect one or more structural members 144, which may be primary structural members 56 and/or secondary structural members 58. Node 720 may be used at one or more of nodes 66, 68, 72, 74, or 134 (see FIG. 2). Node 720 may include an outer dome 722, an inner dome 724, and ribs 726. Outer dome 722 may have a generally hemispherical shape. It is contemplated, however, that outer dome 722 may correspond to a segment of a sphere. A lower surface 728 of outer dome may have a circular shape. It is contemplated, however, that lower surface 728 may have an elliptical, rectangular, triangular, polygonal, or any other shape known in the art. Outer surface 730 of outer dome 722 may have a generally curvilinear shape. Inner dome 724 may be disposed within outer dome 722 and may have a structure similar to that of outer dome 722. One or more ribs 726 may connect an inner surface 732 of outer dome 722 with an outer surface 734 of inner dome 724. Ribs 726 may have a cross-section, which may be circular, elliptical, rectangular, triangular, polygonal, or may have any other shape known in the art. Outer dome 722 may have one or more recesses 736 disposed on outer surface 730. Structural members 144 may be slidingly received in recesses 736. Recess 736 may have an inner wall 738. Inner wall 738 may have a shape which may conform to a shape of end 740 of structural member 144. End 740 may be attached to inner wall 738 of recess 736 using welding, brazing, or any other suitable attachment process known in the art. Node 720 may be fabricated using 3D-printing, casting, molding, or any other suitable process known in the art.

INDUSTRIAL APPLICABILITY

The disclosed space frame may be used in any machine where it is beneficial to reduce the weight of the machine, while increasing the payload-carrying capacity of the machine. The disclosed space frame may find particular applicability with mobile machines such as off-highway mining or quarry trucks designed to haul payloads of tens to hundreds of tons. The disclosed space frame may provide a number of advantages in the operation, manufacture, and maintenance of machine 10.

Space frame 12 may provide a substantial reduction in the weight of machine 10. For example, space frame 12 may provide a reduction in weight of the machine frame of about 30% as compared to a conventional machine frame, and a reduction in total weight of machine 10 of about 6 to 9%. The reduced weight afforded by space frame 12 may allow machine 10 to carry a heavier payload for the same amount of fuel consumed by prime mover 30. Alternatively, the lower machine weight may help reduce the fuel consumption of prime mover 30 for any given payload. During operation, the weight of machine 10 and the weight of the payload may be supported by the tires on the front and rear wheels 14, 16 of machine 10. A lower weight of machine 10 may, therefore, help to reduce an amount of wear on the tires of the front and rear wheels 14, 16 thereby improving the durability and useful life of the tires on machine 10.

Space frame 12 may also advantageously allow the machine to haul a payload, nearly three times as heavy as machine 10 itself. The arrangement of primary structural members 56, secondary structural members 58, 130, edge members 120, 122, 124, 126, 128, first and second support members 78, 80, and cross-support member 104 in space frame 12 may provide a direct load path from the payload to the ground. Similarly, the arrangement of the structural members of space frame 12 may allow grounds loads to be directly absorbed by the front and rear suspension members 18, 20, 108, 110, 114, 116 without distributing the ground loads through space frame 12. As a result bending loads and the accompanying torsional stresses on space frame 12 may be reduced further thus helping to reduce the weight of space frame 12. The distribution of stresses generated by the payload and ground loads in space frame 12 may allow machine 10 to haul a payload of at least three times the weight of machine 10.

Space frame 12 may provide additional advantages associated with manufacture of machine 10. For example, space frame 12 may include a number of discrete primary structural members 56, secondary structural members 58, 130, edge members 120, 122, 124, 126, 128, first and second support members 78, 80, cross-support member 104, and nodes 64, 66, 68, 134. As a result, space frame 12 may advantageously reduce the number of large metal castings needed to manufacture space frame 12. Space frame 12 and its constituent structural members may also be subject to wear and tear during operation of machine 10. The modular construction of space frame 12 may allow quicker removal and replacement of any of primary structural members 56, secondary structural members 58, 130, edge members 120, 122, 124, 126, 128, first and second support members 78, 80, cross-support member 104, and nodes 64, 66, 68, 134, thereby reducing the time for which machine 10 must be taken out of service for maintenance.

Figure 23:
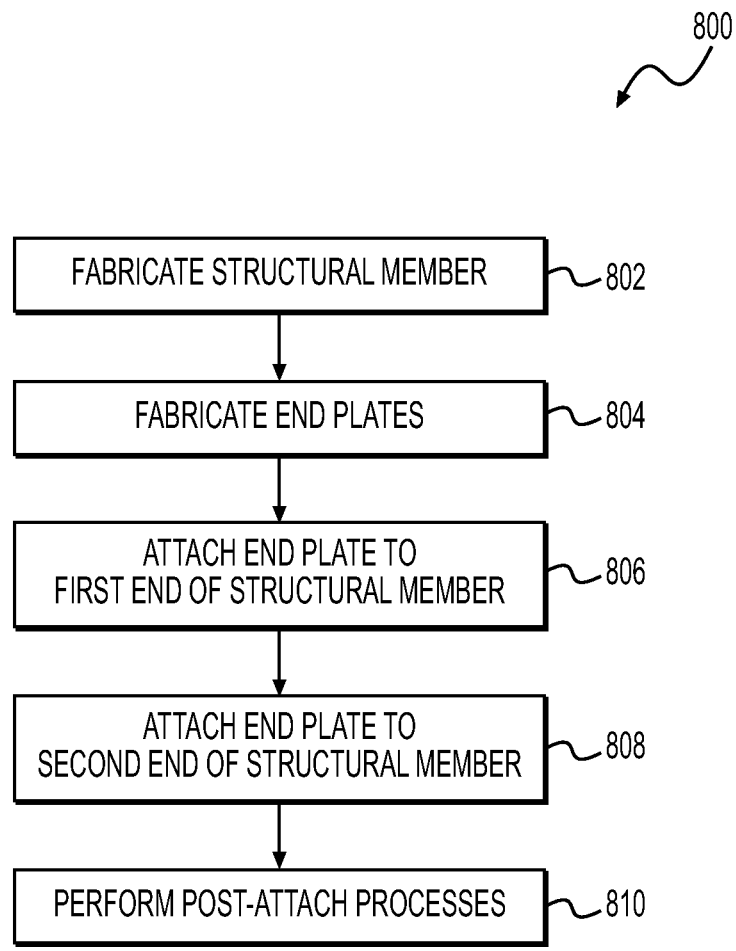
FIG. 23 is a flow chart illustrating an exemplary disclosed method of fabricating the sub-assembly of FIG. 9.

Exemplary methods for fabricating nodes 160, 280, 330, and 480 are discussed next. FIG. 23 illustrates an exemplary disclosed method 800 of fabricating sub-assembly 162 for node 160. As illustrated in FIG. 23, method 800 may include a step of fabricating structural member 144 (Step 802). In one exemplary embodiment, fabricating structural member 144 may include cutting a piece of solid or annular rolled stock of material to a predetermined length. Alternatively, fabricating structural member 144 may include cutting a solid bar of material to a desired length, followed by machining the bar to create an annular cross-section. Fabricating structural member 144 may also include machining first and second ends 170 and 172 to a predetermined shape. For example, first and second ends 170 and 172 may be machined so that the ends are generally orthogonal to longitudinal axis 176. In one exemplary embodiment, machining first and second ends 170 and 172 may include machining grooves at first and second ends 170 and 172 to help ensure that a sufficient volume may be available for a weld fillet. Fabricating structural member 144 may additionally include processes for de-burring, polishing, and/or removing sharp edges on structural member 144.

Method 800 may also include a step of fabricating end plates 166 (Step 804). In one exemplary embodiment, fabricating end plates 166 may include stamping out end plates 166 from a sheet stock of material. Additionally or alternatively, fabricating end plates 166 may include machining pre-cut sheet stock to a predetermined size of end plate 166. Fabricating end plate 166 may also include processes for de-burring, polishing, and/or removing sharp edges on end plates 166.

Method 800 may also include a step of attaching end plate 166 to first end 170 of structural member 144 (Step 806). Attaching end plate 166 may include assembling end plate and structural member 144 in a fixture so that first end 170 of structural member 144 abuts end plate 166. Attaching end plate 166 may also include welding outer edge 178 to end plate 166. Method 800 may also include a step of attaching an end plate 166 to second end 172 (Step 808). Attaching end plate 166 to second end 172 in step 808 may include processes similar to those discussed above for step 806. Attaching end plates 166 to first end 170 and second end 172 may produce sub-assembly 162.

Method 800 may include a step of performing post-attach processes (Step 810). Performing post-attach processes may include processes for de-burring, polishing, and/or removing sharp edges on sub-assembly 162. Post-attach processes may also include processes such as annealing, heat treating, etc. to relieve mechanical stresses induced in sub-assembly 162 during steps 802 through 808.

Figure 24:
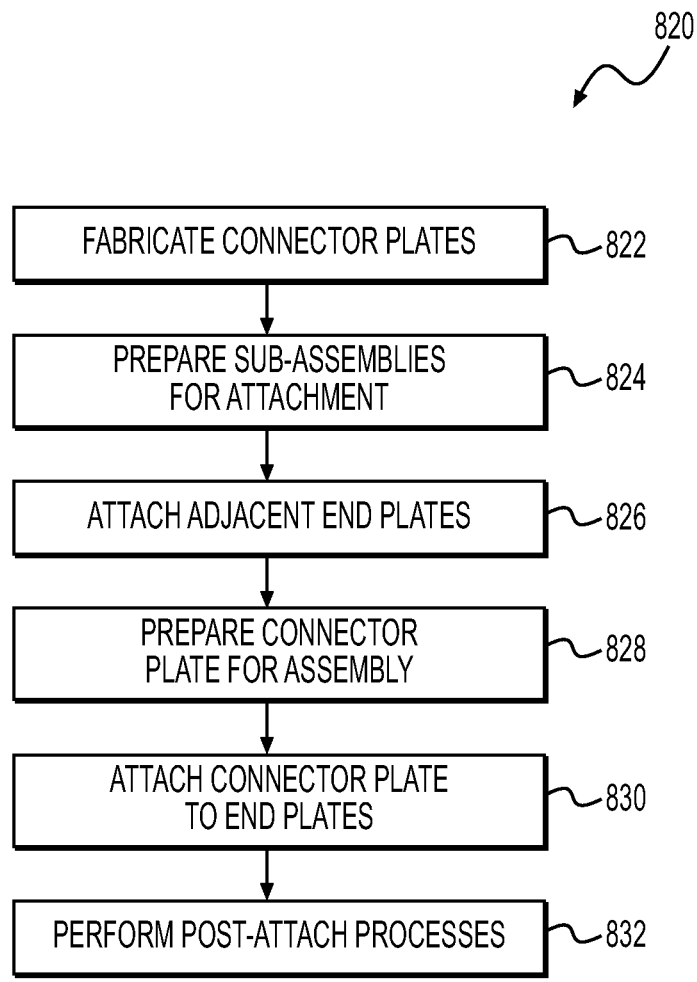
FIG. 24 is a flow chart illustrating an exemplary disclosed method of fabricating the node of FIG. 8.

FIG. 24 illustrates an exemplary disclosed method 820 of fabricating node 160. As illustrated in FIG. 24, method 820 may include a step of fabricating connector plates 164 (Step 822). Fabricating connector plates 164 may include processes similar to those discussed above for fabricating end plates 166 in step 804 of method 800. Fabricating connector plates 164 may also include machining one or more of first, second, and third attachment edges 256, 258, 260 at predetermined angles of inclination relative to each other. In one exemplary embodiment, fabricating the one or more of first, second, and third attachment edges 256, 258, 260 may include machining grooves in first, second, or third attachment edges 256, 258, 260 so that a sufficient volume may be available for a weld fillet. Fabricating connector plates 164 may additionally include processes for de-burring, polishing, and/or removing sharp edges on connector plates 164.

Method 820 may also include a step of preparing sub-assemblies 162 for attachment (Step 824). Preparing sub-assemblies for attachment may include arranging one or more sub-assemblies in a fixture so that an end plate 166 of one sub-assembly 162 abuts an end plate 166 of another sub-assembly 162. For example, with reference to FIG. 8, preparing sub-assemblies 162 may include aligning first and second structural members 180 and 182 at a first angle $\theta_1$ so that first trailing edge 216 of first end plate 186 abuts second leading edge 234 of second end plate 188.

Method 820 may also include a step of attaching adjacent end plates 166 (Step 826). Attaching adjacent end plates 166 may include welding abutting edges of end plates 166. For example, with reference to FIG. 8, attaching adjacent end plates 166 may include welding first trailing edge 216 of first end plate 186 to second leading edge 234 of second end plate 188 while maintaining first angle $\theta_1$ between first longitudinal axis 196 and second longitudinal axis 198. Step 826 may be repeated to attach additional sub-assemblies 162. For example, with reference to FIG. 8, step 826 may be repeated to attach third end plate 190 to second end plate 188 so that third structural member 184 is disposed at a second angle $\theta_2$ relative to second structural member 182.

Method 820 may also include a step of preparing connector plate 164 for assembly (Step 828). Preparing connector plate 164 for assembly may include assembling connector plate 164 with sub-assemblies 162 such that first, second, and third, attachment edges 256, 258, 260 may be aligned with end plates 166. For example, with reference to FIG. 8, preparing connector plate 164 may include assembling connector plate 164 in a fixture so that first attachment edge 256 abuts first distal edge 220 of first end plate 186 and second attachment edge 258 abuts second distal edge 240 of second end plate 188.

Method 820 may also include a step of attaching connector plate 164 to end plates 166 (Step 830). Attaching connector plate 164 may include welding abutting edges of connector plate 164 and end plates 166. For example, with reference to FIG. 8, attaching connector plate 164 may include welding first attachment edge 256 to first distal edge 220 of first end plate 186 and welding second attachment edge 258 to second distal edge 240 of second end plate 188. Step 830 may be repeated to attach connector plate 164 to additional end plates 166. For example, third end plate 190 may be attached to third attachment edge 260 by welding third end plate to third attachment edge 260. It is contemplated that steps 828 and 830 may be repeated as necessary to attach additional connector plates 164 to end plates 166 in node 160.

Method 820 may also include a step of performing post-attach processes (Step 832), which may include processes similar to those discussed above with respect to step 810 of method 800. Methods 800 and 820 may provide a simple and cost-effective way to fabricate node 160. For example, the welding process to fabricate node 160 may be simplified because all the welded joints between structural members 144 and end plates 166 and between end plates 166 and connector plates 164 require linear or in-plane welds. Furthermore, the welded joints may help ensure node 160 can withstand torsional loads imposed on the space frame 12 by the weight and payload of machine 10 and the ground forces reacted on space frame 12 by front and rear wheels 14, 16.

Figure 25:
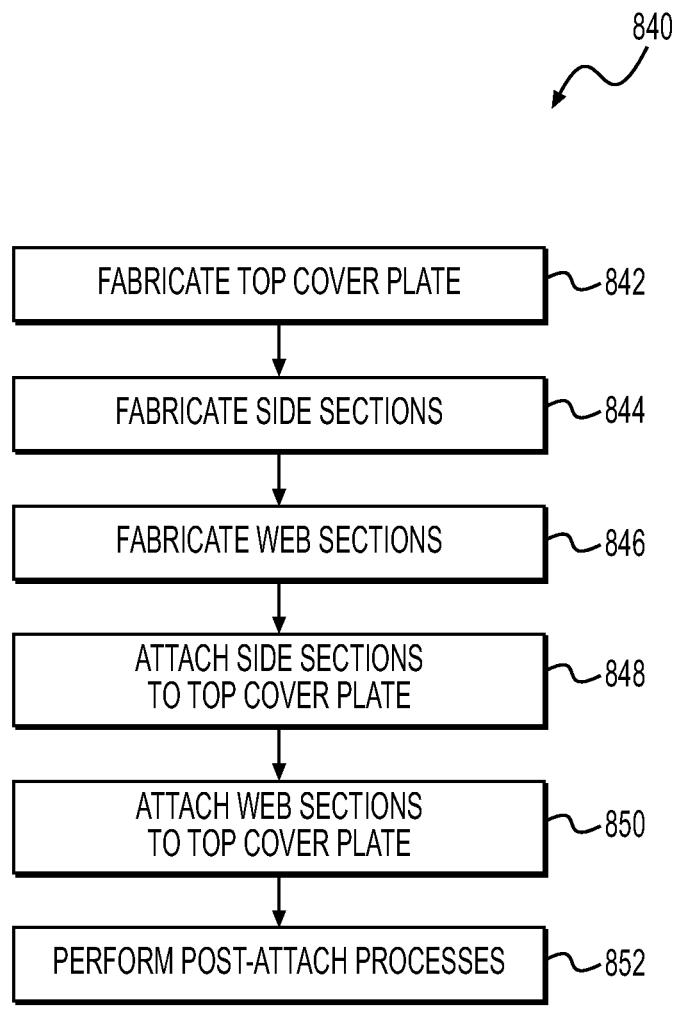
FIG. 25 is a flow chart illustrating an exemplary disclosed method of fabricating the cover plate of FIG. 12.

FIG. 25 illustrates an exemplary disclosed method 840 of fabricating top cover 332 for node 330. As illustrated in FIG. 25, method 840 may include a step of fabricating top cover plate 338 (Step 842). Fabricating top cover plate 338 may include processes similar to those discussed above for fabricating end plates 166 in step 804 of method 800. Fabricating top cover plate 338 may also include machining one or more of top cover edges 346 inclined relative to each other at predetermined angles. In one exemplary embodiment, fabricating top cover plate 338 may also include machining grooves in top cover edges 346 so that a sufficient volume may be available for a weld fillet. Fabricating top cover plate 338 may additionally include processes for de-burring, polishing, and/or removing sharp edges on top cover plate 338.

Method 840 may also include a step of fabricating side sections 340 (Step 844). In one exemplary embodiment, fabricating side sections may include fabricating a blank of sheet metal, which may include processes similar to those discussed above for fabricating end plates 166 in step 804 of method 800. Fabricating side sections 340 may also include a stamping or forming process to fabricate recess portion 358 and transition portion 360 from the blank. For example, a stamping process may be used to stamp recess portion 358 into a portion of the blank and a transition portion into the remainder of the blank. Furthermore, fabricating side sections 340 may include machining the blank to fabricate transition edges 370. Fabricating side sections 340 may additionally include processes for de-burring, polishing, and/or removing sharp edges on side sections 340.

Method 840 may also include a step of fabricating web sections 342 (Step 846). Fabricating web sections 342 may include processes similar to those discussed above for fabricating end plates 166 in step 804 of method 800. Further, fabricating web sections 342 may include machining web leading edge 372, web trailing edge 374, and web outer edge 376 so that web leading edge 372, web trailing edge 374, and web outer edge 376 may be inclined relative to each other at predetermined angles. Fabricating web sections 342 may also include drilling and/or threading one or more hoses 378. Fabricating web sections 342 may additionally include processes for de-burring, polishing, and/or removing sharp edges on web sections 342.

Method 840 may also include a step of attaching side sections 340 to top cover plate 338 (Step 848). Attaching side sections 340 may include assembling side sections and top cover plate 338 in a fixture so that transition edge 370 of side section 340 abuts a top cover edge 346 of top cover plate 338. Attaching side sections 340 may include welding transition edge 370 to top cover edge 346. Steps 846 and 848 of method 840 may be repeated to attach additional side sections 340 to top cover plate 338.

Method 840 may also include a step of attaching web sections 342 (Step 850). Attaching web sections 342 may include assembling one or more web sections 342 and the partially finished top cover plate from step 848 in a fixture so that web leading edge 372 may abut recess trailing edge 366 and web trailing edge 374 may abut recess leading edge 364. Attaching web sections 342 may further include welding web leading edge 372 with recess trailing edge 366 and welding web trailing edge 374 with recess leading edge 364.

Method 840 may also include a step of performing post-attach processes (Step 852), which may include processes similar to those discussed above with respect to step 810 of method 800. Method 840 may provide a simple and cost-effective way to fabricate top cover plate 338. For example, the welding process required to fabricate top cover plate 338 may be a simple linear welding process because all the welded joints between side sections 340 and top cover plate 338 and between web sections 342 and side sections 340 require linear or in-plane welds. Furthermore, such linear welding processes may be easily automated to further realize manufacturing efficiencies. Additionally, the welded joints may help ensure node 160 can withstand torsional loads imposed on the space frame 12 by the weight and payload of machine 10 and the ground forces reacted on space frame 12 by front and rear wheels 14, 16.

One of ordinary skill in the art would recognize that bottom cover 334 may be fabricated using steps similar to those discussed above for fabricating top cover 332. For example bottom cover plate 390, side sections 392, and web sections 394 may be fabricated using the processes discussed above with respect to steps 842, 844, and 846, respectively. Further the processes described above for steps 848-852 may be used to fabricate top cover 332 using bottom cover plate 390, side sections 392, and web sections 394. One of ordinary skill in the art would also recognize that core 336 may be fabricated using steps similar to those discussed above for fabricating top cover 332. For example, core cover plate 410 may be fabricated using processes described above with respect to step 842. Projections 412, and core upper connection 414 may be fabricated using processes similar to those discussed above with respect to step 844 for fabricating side sections 340. In addition, the processes discussed above with respect to steps 848-852 may be used to fabricate core 336 using core cover plate 410, projections 412, and core upper connection 414.

Figure 26:
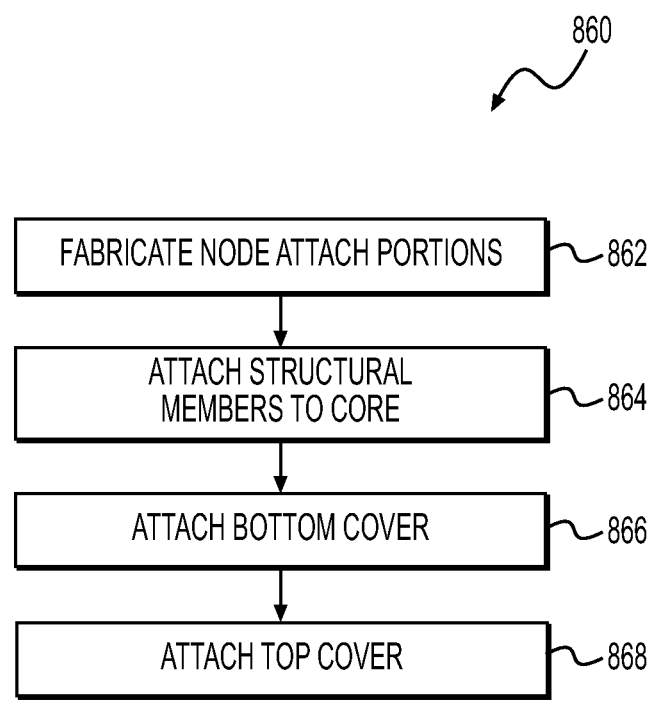
FIG. 26 is a flow chart illustrating an exemplary disclosed method of fabricating the node of FIG. 11.

FIG. 26 illustrates an exemplary disclosed method 860 of fabricating node 330. As illustrated in FIG. 26, method 860 may include a step of fabricating node attach portions 460 on structural members 144 (Step 862). Fabricating node attach portion 460 may include fabricating structural members 144 by, for example, cutting a piece of annular rolled stock of material to a predetermined length extending from a front end 464 to a rear end 466. Fabricating node attach portion 460 may further include using mechanical or hydroforming processes to form a node attach portion 460 extending from the front end 464 to a distal end 468 disposed between the front end 464 and the rear end 466. The mechanical or hydroforming process may produce a node attach portion 460 with an inner surface 472 having a non-circular cross-section. In one exemplary embodiment, structural members 144 may have a generally circular cross section and node attach portion 460 may have a non-circular cross-section. Node attach portions 460 may also be fabricated separate from structural members 144 using casting or molding. Node attach portions 460 may then be attached first ends 172 of structural members 144 by welding node attach portions 460 to first ends 172 of structural members 144.

Method 860 may also include a step of attaching structural members 144 to core 336 (Step 864). Attaching a structural member 144 to core 336 may include sliding node attach portion 460 of structural member 144 onto projection 412 of core 336 so that node attach inner surface 472 may circumscribe and abut outer surface 434 of body portion 428 of projection 412. Node attach portion 460 of structural member 144 may be slidingly attached to projection 412 via interference fit. Additionally, after sliding node attach portion 460 onto projection 412, edges 470 of node attach portion 460 may be welded to outer surface 434 of body portion 428.

Method 860 may include a step of attaching bottom cover 334 (Step 866). Attaching bottom cover 334 may include assembling the partially finished assembly from step 864 onto bottom cover 334 so that outer surfaces 174 of structural member 144 may be slidingly received in bottom recesses 402 of side sections 392. Method 860 may also include a step of attaching top cover 332 (Step 868). Attaching top cover 332 may include assembling top cover 332 onto the partially finished assembly from step 866 so that outer surfaces 174 of structural member 144 are slidingly received in top recesses 362 of side sections 340. Receiving structural members 144 in top recesses 362 may include ensuring that recess inner surface 368 abuts outer surface 174 of structural members 144. Attaching top cover 332 may further include inserting fasteners through holes 356 of top cover 332 and holes 396 of bottom cover 334 to attach top cover 332 with bottom cover 334. In one exemplary embodiment, fasteners may pass through holes 356 of top cover 332 and may be threadingly received in holes 396 of bottom cover 334 to attach top cover 332 with bottom cover 334. Additional fasteners may be inserted through holes 378 in web sections 342 of top cover 332 and holes 400 of bottom cover 334 to further secure top cover 332 with bottom cover 334.

One of ordinary skill in the art would recognize that steps 842-852 of method 840 and steps 862-868 of method 860 may also be used to fabricate node 480. For example, step 842 of method 840 may be used to fabricate filler plates 494 and step 846 of method 840 may be used to fabricate web sections 510. Likewise, step 844 of method 840 may be used to fabricate side sections 490 and upper connections 492. Further steps 848-852 of method 840 may be used to attach filler plates 494, web sections 510, side sections 490, and upper connections 492 to fabricate top cover 482 and/or bottom cover 484. Similarly, step 842 of method 840 may be used to fabricate filler plates 592. Additionally, step 844 of method 840 may be used to manufacture projections 590. Steps 848-852 of method 840 may be used to attach projections 590 and filler plates 592 to fabricate core 486. Node 480 may be fabricated using steps 862-868 to attach structural members 144 to core 486 and further to attach top cover 482 and bottom cover 484 to structural members 144 and core 486 to fabricate node 480.

It will be apparent to those skilled in the art that various modifications and variations can be made to the disclosed node for a space frame without departing from the scope of the disclosure. Other embodiments of the node for the space frame will be apparent to those skilled in the art from consideration of the specification and practice of the space frame disclosed herein. It is intended that the specification and examples be considered as exemplary only, with a true scope of the disclosure being indicated by the following claims and their equivalents.

What is claimed is:

1. A node, comprising:
   a core;
   a projection extending from the core;
   a structural member configured to be attached to the projection;
   a top cover including a top recess configured to receive the structural member;
   a bottom cover including a bottom recess configured to receive the structural member;
   a fastener to connect the top cover and the bottom cover;
   wherein the structural member has a node attach portion disposed at a first end of the structural member;
   wherein the projection is configured to slidingly receive the node attach portion of the structural member; and
   wherein the core includes a cover plate having a cover edge and the projection is attached to the cover edge.

2. The node of claim 1, wherein, the structural member is a first structural member having a first longitudinal axis, the projection is a first projection, the top recess is a first top recess, the bottom recess is a first bottom recess, and the node further includes:
   a second projection extending from the core; and
   a second structural member configured to be attached to the second projection, the second structural member having a second longitudinal axis, wherein
      the top cover has a second top recess configured to receive the second structural member, and
      the bottom cover has a second bottom recess configured to receive the second structural member.

3. The node of claim 2, wherein the first longitudinal axis is inclined relative to the second longitudinal axis.

4. The node of claim 1, wherein the projection includes:
   a body portion extending from the cover edge to a body portion end, the body portion including an outer surface; and
   a lead-in portion attached to the body portion and extending from the body portion end to an outer end, the lead-in portion having a first cross-section at the outer end and a second cross-section at the body portion end, wherein the first cross-section is smaller than the second cross-section.

5. The node of claim 4, wherein the lead-in portion includes:
   a curvilinear surface extending from the outer end to the body portion end; and
   a transition edge at the body portion end, the transition edge being attached to an edge of the outer surface of the body portion.

6. The node of claim 1, wherein the top cover includes:
   a top cover plate having a top cover edge; and
   a side section attached to the top cover plate at the top cover edge.

7. The node of claim 6, wherein the side section includes:
   a recess portion including the top recess extending from a recess leading edge to a recess trailing edge; and
   a transition portion extending from the recess portion to the top cover edge.

8. The node of claim 7, wherein the transition portion includes a transition edge disposed adjacent the top cover edge and the transition edge is welded to the top cover edge.

* * * * *